(12) United States Patent
Ferguson-Walter et al.

(10) Patent No.: US 11,934,948 B1
(45) Date of Patent: Mar. 19, 2024

(54) ADAPTIVE DECEPTION SYSTEM

(71) Applicant: The Government of the United States as represented by the Director, National Security Agency, Fort George G. Meade, MD (US)

(72) Inventors: Kimberly J Ferguson-Walter, San Diego, CA (US); Sunny James Fugate, San Diego, CA (US)

(73) Assignee: The Government of the United States as represented by the Director, National Security Agency

( * ) Notice: Subject to any disclaimer, the term of this patent is extended or adjusted under 35 U.S.C. 154(b) by 697 days.

(21) Appl. No.: 16/930,046

(22) Filed: Jul. 15, 2020

Related U.S. Application Data

(60) Provisional application No. 62/874,806, filed on Jul. 16, 2019.

(51) Int. Cl.
| H04L 29/06 | (2006.01) |
| G06N 3/04 | (2023.01) |
| G06N 3/08 | (2023.01) |
| H04L 9/40 | (2022.01) |

(52) U.S. Cl.
CPC .............. *G06N 3/08* (2013.01); *G06N 3/04* (2013.01); *H04L 63/1491* (2013.01)

(58) Field of Classification Search
CPC ............ H04L 63/1425; H04L 63/1433; H04L 63/1408; H04L 63/1416; H04L 63/30; H04L 63/1491; H04L 41/0816; H04L 41/081
See application file for complete search history.

(56) References Cited

U.S. PATENT DOCUMENTS

| 8,413,241 | B2 | 4/2013 | Weeks et al. |
| 9,553,886 | B2 | 1/2017 | Touboul et al. |
| 9,712,547 | B2 | 7/2017 | Touboul et al. |
| 9,742,805 | B2 | 8/2017 | Touboul et al. |
| 9,866,575 | B2 | 1/2018 | Schwartz et al. |
| 10,015,198 | B2 | 7/2018 | Ettema et al. |
| 10,091,238 | B2 | 10/2018 | Shieh et al. |

(Continued)

FOREIGN PATENT DOCUMENTS

| WO | WO2017013589 A1 | 1/2017 |
| WO | WO2017053806 A1 | 3/2017 |

*Primary Examiner* — Evans Desrosiers

(57) ABSTRACT

An adaptive deception system is provided for defending a production network against cyber-attacks utilizing deception devices on the production network. The adaptive deception system includes a deception management system. The deception management system includes monitors for making observations regarding the deception devices including observations of an attacker's interaction with the deception device. The adaptive deception system further incudes a control system having sensors that receive the observations of the deception management system. The control system is configured to provide an adaption specification in response to the observations made. Actuators of the control system are activated in order to provide the adaption specification to the deception management system where monitors of the deception management system implement the specified adaption. Implementation of the adaption adapts the properties of the deception devices to interfere with the cyber-attacker.

19 Claims, 10 Drawing Sheets

(56) References Cited

U.S. PATENT DOCUMENTS

| | | | |
|---|---|---|---|
| 10,291,650 | B2 | 5/2019 | Touboul et al. |
| 10,404,747 | B1 | 9/2019 | Sela et al. |
| 10,440,055 | B2 | 10/2019 | Allen et al. |
| 2002/0066034 | A1 | 5/2002 | Schlossberg et al. |
| 2012/0254333 | A1* | 10/2012 | Chandramouli ........ G06F 40/10 709/206 |
| 2016/0080414 | A1 | 3/2016 | Kolton et al. |
| 2017/0134423 | A1 | 5/2017 | Sysman et al. |
| 2017/0329783 | A1* | 11/2017 | Singh .................. H04L 63/1441 |
| 2019/0253453 | A1 | 8/2019 | Vissamsetty et al. |
| 2020/0322361 | A1* | 10/2020 | Ravindra ............ G06F 16/2477 |

\* cited by examiner

US 11,934,948 B1

ADAPTIVE DECEPTION SYSTEM

RELATED APPLICATIONS

This application claims the benefit of U.S. provisional patent application Ser. No. 62/874,806 filed Jul. 16, 2019, which is hereby incorporated by reference.

FIELD OF THE INVENTION

This invention is generally directed to automated systems and methods for actively defending a computer network from cyber-attacks.

BACKGROUND OF THE INVENTION

Current methods used for network reconnaissance and system exploitation are not sufficiently addressed by existing cyber defense techniques. This has led to an asymmetric disadvantage for cyber defenders. The defender must protect against and detect all possible attacks at all times while the attacker only needs to find a single vulnerable path. If any exploitable vulnerability exists, eventually, an attacker will discover and exploit this vulnerability, leading to system compromise, data theft, or even destruction.

FIG. 1 illustrates an enterprise network 100 subject to a cyber-attack. The network 100 generally includes a production network 106 in communication with the Internet 108, a firewall 110, a demilitarization zone (DMZ) 112 (encompassing a webserver 115, a honeypot 117, and a honeynet 119), a management network 114, and management systems 116.

A production network 106 to be protected from cyber-attacks generally includes a plurality of production devices 122 for example a plurality of computer systems interconnected via a network such as a traditional internet protocol (IP) network. Production devices 122 residing on the production network 106 include, for example, a WINDOWS 10 operating system computer, a LINUX operating system computer, an email server, a file server, a web server, a Wi-Fi access point, a WINDOWS 10 operating system server, a printer, a mobile phone, or a laptop computer. The production network 106 is used for regular business and computing purposes such as, for example, sending a document to a printer; browsing a website; checking email; or drafting a document. The production network 106 may optionally include many other devices not illustrated, for example devices providing network services such as network routers; network switches; web server network services or file server network services; network routing services to reach other networks; access to wide-area networks such as a business enterprise network; and access to the Internet. The production network may also include for example, specialized computing devices such as embedded controllers, supervisory control and data access (SCADA) systems, and industrial control systems (ICS).

The management network 114 is used to securely manage each of the devices 122 of the production network 106. In general, it is a best practice to ensure that the management and production networks 114, 116 are either physically or logically isolated from one another to prevent an attacker from gaining control of the management interfaces of devices on the network and using this control to compromise systems or information on the production network 106. By using separate networks for management versus production purposes the network communications and business purposes of the production network 106 and its resident systems 122 are made more secure.

The management network 114 generally includes a plurality of protected management systems 140 and a plurality of management systems 116. The protected management systems 140 include, for example, a network analyst workstation, a system administrator workstation, a network administrator workstation, a security incident and event management system, a network forensics analysis system, and a production network vulnerability database. Management systems 116 include for example: a router configuration management system, a network service management system, a netflow and packet capture system, a system provisioning and management system, a vulnerability discovery and mitigation system, and intrusion detection systems, including for example, a signature-based detection system and an anomaly-based detection system. The management systems 116 bridge the production and management networks 106, 114 and monitor network and system activities in order to detect attacks and other malicious or potentially malicious activities. These management systems 116 are placed in a manner allowing the management systems 116 to measure activities on the production network 106 and provide alerting and other forms of reporting to various network and system management and security management systems on the management network 114. The management network 114 gathers event logs from individual management systems 116, such as, for example, connection records from routing devices, and alerts from network and host-based sensors such as intrusion detection systems (IDSs).

Many of the devices on the enterprise network 100 are general purpose computer systems 150 as illustrated in FIG. 2. A general-purpose computer system 150 generally includes one or more central processing units 156; memory and storage 158; system buses and interconnects; one or more input/output (I/O) interfaces 160; and one or more network interfaces 162. The memory and storage 158 generally includes RAM 164 in communication with the central processing unit 156 and cache 166 in communication with the processing unit 156 and storage system 168. The processing unit 156 is in communication with the I/O interfaces 160 and the network interface 162 via system buses and interconnects. The I/O interface allows for communication with the compute system 150 via a display 170 or other peripheral devices 172. A computer network 100 as illustrated by FIG. 1 consists of many such systems 150 which may be interconnected and/or connected to a production or management network 106/114 via their network interfaces 162.

As illustrated in FIG. 1, numerous methods exist for defending production networks 106 from cyber-attacks caused by internal or external attackers 148, 144, including the use of firewalls, management systems 116, honeypots 117 and honeynets 119.

Management systems 116 include, for example, intrusion detection systems. Intrusion detection systems (IDS) include, for example signature/pattern-based detections systems or anomaly-based detection systems. FIG. 1 illustrates the placement of signature and anomaly detection systems in relation to production and management networks. Both signature-based and anomaly-based detection methods are used to monitor system and network activity for the purpose of performing detection of attacks and other malicious or potentially malicious activities. These sensors are commonly placed such that they measure activities on the production network and provide alerting and other forms of reporting to various network and system management and security management systems on a management network.

A signature/pattern-based detection system uses fixed or dynamic patterns that are associated with malicious activity to provide an indication of a possible cyber-attack. For example, a signature-based IDS such as Snort, Bro, Suricata, or others may use string and regular expression patterns as well as rule-based patterns over sequences of IP packets, ethernet frames, UDP and TCP sessions, or reconstructed content to detect indicators of malicious activity. A benefit of signature-based detection is a low false-alarm rate. The patterns used for detection are very specific and unlikely to be observed in non-malicious network communications or during normal system activities. Pattern-based detectors, however, are associated with high rates of false-negatives because, by design, pattern-based detectors can only detect known attacks (i.e. patterns previously detected and identified as malicious). In addition, these pattern/signature-based detectors are easy to circumvent when an attacker modifies their attack such that the signature the detector is looking for is no longer present.

An anomaly-based detection system uses a statistical measure over some number of features and a single or set of thresholds for which violations of one or more thresholds indicate likely malicious behavior. Anomaly-based detectors are designed and tuned to be able to detect a wide range of potentially malicious activity. Depending on the specificity of the features and how the detection algorithm is trained, compared to signature-based detection an anomaly-based detector can be tuned to provide low false-negative rates. Unfortunately, the ability to detect as yet unseen anomalies also results in higher false-positive rate; i.e., the statistical thresholds often catch legitimate traffic. As a result, these systems are often tuned to limit the number of false positives resulting in simultaneously increasing the false negative rate thus enabling attackers to more easily circumvent detection.

When a cyberattack is detected using signature-based or anomaly-based methods, a message is generally sent to a SEIM (Security Event Incident Management) System or to an administrator or analyst to provide an alert regarding the intrusion. FIG. 1 illustrates the placement of a network analyst workstation, administrator workstations, and other protected management systems. Such a workstation might be used to connect to various production network security systems and sensors. Alerts from an IDS are generally ignored when it can be determined that they are low impact or unreliable. If the alerts are high impact they will be manually triaged and responded to. Due to the high false-positive rates of many techniques, there are often more alerts received than can be handled by the personnel available.

Honeypots 117 and honeynets 119 provide additional methods of defending against cyber-attacks and fill a gap left by IDS since they can often detect attacks even when no patterns or anomalies are present. A honeypot is a fake system which is placed onto a computer network. Normal users do not interact with honeypots or honeynets as these systems do not provide any utility for business or other computing purposes. Therefore, the mere interaction of an attacker with a honeypot provides an indication of malicious intent. In general, the goal of placing a honeypot on a network is to lure an attacker into interacting with it instead of another real computer system. A honey-network or "honeynet" is an extension of this same methodology in which many honeypot systems are placed onto a network. By placing many fake systems into their own network, cyber defenders hope to entice an attacker into interacting with multiple systems over a longer period of time. A primary goal of these technologies is to tempt an attacker 148 by looking more attractive or more vulnerable than nearby real systems. Another goal of these technologies is to learn more about an attacker through observations of their interactions with honeypots and honeynets. The collected information is then examined at a later time.

Honeypots and honeynets are traditionally deployed outside of the boundaries of a protected network with the goal of drawing an attacker into the honeypot and away from the true network. Generally, this means that honeypots and honeynets are placed outside of the boundary defenses of a network such as within the de-militarized zone (DMZ) 112—the region of a network outside of firewalls 110 and other boundary defenses. FIG. 1 illustrates the placement of a honeypot and honeynet in a DMZ 112 outside of the firewall 110 of a production network 106. Honeypots 117 are rarely deployed to co-exist in the same subnet as protected and valuable production devices 122 as doing so could put the protected production devices 122 at risk if the honeypot itself were to become compromised. Similarly, honeynets are intended to represent an entire network of systems in order to lure an attacker into lengthy interactions with honeypot systems which intentionally allow an attacker to make continual progress in their attack.

Another method used to defend against cyber-attacks is to use decoys. The use of decoys to defend against a cyberattack differs from the use of honeypots in that a decoy is deployed within the boundary of the network to be defended and is designed to defend against an attacker who has already breeched the perimeter defenses or already has a foothold on the production network, an internal attacker 144. Unlike honeypots, decoys are generally very low cost to create and maintain. They tend to be lower fidelity than honeypots in their interactions and realism. Decoys, unlike traditional honeypots are designed to be placed in close proximity to other devices on the production network 106. Whereas traditional honeypots must have realistic services which allow high-fidelity interactions and continue to "feel" real during interactions with an attacker, decoys can present deceptions which are much less realistic, and by design do not allow high-fidelity abilities to interact with an attacker. This results in significantly less risk of the decoy becoming a security risk due to its proximity to real hosts on the same network. Further, when placed in internal network locations decoys systems appear more "real" than a honeypot 117 deployed in a DMZ 112 simply due to their proximity to the production network 106 and the production devices 122. Due to their proximity to production devices 122 on the production network 106 such decoys are also well-suited to implement a wide array of defensive strategies which are not feasible using traditional honeypots 117. One primary goal of these technologies is to detect the presence of an attacker on a computer network. Upon interaction with a decoy the attacker's presence becomes known and defensive actions might be taken as a result. These technologies also protect production devices 122 by distracting attackers and wasting their time and effort. Various strategies can also be employed to misinform attackers about the true topology and configuration of the production network 106, disrupting current and future attacks.

Recent advances in software architectures have enabled computing systems to be constructed in such a way that they no longer require physical hardware, but can be run on virtualized hardware in a virtual machine and more recently within "containerized" implementations where each system shares some resources with the underlying computer system.

FIG. 3 illustrates a network 200 including a computer system such as that illustrated in FIG. 2 which has been configured to run a container system service 201.

The network 200 includes a host computer system 202 in communication with a management network 114 and a production network 106. The host computer system 202 runs a traditional host operating system 216, software applications, system services, and network services and generally includes a host computer memory and storage 212 network interface 204 for interacting with the production network 106 and network interface 206 for interacting with the management network 114. Host computer memory and storage 212 is selectively allocated to one or more guest computer systems 214 through the container system service 201.

The computer system 200 has been designated as a "host" computer system because it is used to "host" one or more "guest" computer systems 214 which are run by the container system service 201. Each guest computer system 214 runs in a "container" 201 which provides all underlying computer hardware and software-to-hardware interactions through emulation or virtualization or a combination thereof. The container system service 201 is a software application designed to provide a virtualized or emulated computer hardware suitable for running or "hosting" one or more "guest" computer systems 214. The container system service 201 provides an emulation or virtualization of realistic physical hardware as illustrated in FIG. 2. Further, the container system 201 provides a means of isolating each guest computer system 214 from the host operating system 216 and from other guest computer systems 214. Methods for ensuring isolation between host operating system 216 and guest computer systems 214 and isolation between individual guest computer systems 214 running on the same host 202 are known.

Each guest computer systems 214 includes guest computer memory and storage 220 and guest network interfaces 222 and runs a guest operating system 218. The guest computer systems 214 are virtualized or containerized such that they operate as if they were running on physical computer hardware. Operating systems 218 and software running within such a guest computer system treat the guest computer system in the same manner as a physical computer system. For all intents and purposes each guest computer system 214 has all of the functionality of a computer system as described but not limited to FIG. 2 and can be treated as if it were indistinguishable from a computer system composed of physical hardware rather than virtualized or emulated hardware. The guest computer systems 214 are in communication with the network via the host network interface 204. The guest computer systems 214 are in communication with the host memory and storage 212. Each guest computer system 214 can each be allocated as indicated at 220 various quantities of underlying host computer system resources such as amount of random-access memory (RAM), disk storage, and network bandwidth.

The guest operating system 218 runs multiple system services 222 (such as software applications) and network services 224 (such as software applications which communicate using the TCP/IP protocol and provide access to data or other services via a computer network). The system services 222 and the networks services 224 utilize the guest computer memory and storage 220 and guest network interfaces 226 provided by the guest computer system 214. The memory and storage 220 and network interfaces 226 provided to the guest computer system 214 are virtual devices and virtual storage which are provided by the container system service 201. In some implementations the container system services 201 "emulates" these physical computing resources. In other implementations the container system service 201 provides restricted access to the actual computing resources of the host computing system 202, but in a manner which limits access to a subset of the available hardware resources of the host computer system 202.

The guest computer systems 214 and container system service 201 can be configured to ensure that the host computer memory and storage 212 are administratively and logically isolated between guest computer systems 214. While guest computer systems 214 can be configured to share various underlying host operating systems 216 and computer system resources, container system services 201 can also be configured to provide each guest computer system 214 with its own logically independent and isolated components. This is achieved by virtualizing each computer system component required by the guest operating system 218. In certain cases, as shown in FIG. 3, each guest computer system 214 is connected to logically isolated memory and storage 220. Each guest computer system 214 includes all of the components of FIG. 2, including a network interface 226 which connects to the network 106 with independent network settings. In this configuration, the network interface 226, memory and storage 220, and other computational resources are logically isolated so that each guest computer system 214 runs within its own isolated execution context or "sandbox". This protects each guest computer system 214 from tampering with or interaction with any other guest computer system 214 or with the host operating system 216. For all intents and purposes, the guest computer systems 214 are logically isolated from one another and can be treated as independent computer systems.

As illustrated in FIG. 4, a deception management system 300 is provided by host computer system running a container system service 301 running guest computer systems 302 as decoys. Each guest computer system 302 is a decoy or more broadly, a "deception device". The term "deception device" is used as a generalization to encompass various types of deceptive devices. The terms "deception device" and "decoy" are herein used interchangeably throughout to mean any type of decoy, honeypot, honeynet, or other class of deception device or software regardless of the level of fidelity. The container system service 301 includes an API 304 used to interact with and modify the running state and configuration of each decoy 302, each guest operating system 306, the memory and storage 308 of the decoy 302, each system services 310 running in the guest operating system, each network service 312 running in the guest operating system, and each guest network interface 314. FIG. 4 further illustrates the incorporation of management components 316 used to perform management of each of the computing elements which are run by the container system service. These managers 316 include: system managers which manage the guest computer system; system service managers which manage individual system services running in the guest operating system; network service managers which manage individual network services; file system managers which manage and manipulate the memory and storage of the guest computer system; and network interface managers for manipulating each guest network interface. The running state of any aspect of the guest computer system and its running operating system or software can be modified in any way desired by this collection of management interfaces. FIG. 4 further illustrates the use of various monitoring elements 318 to measure the internal aspects of the container system service 301, the guest computer system 302, and each of the underlying components and each of the system services 310 and network services 312 of the guest operating system. Monitors may consist of system monitors for monitoring the running state of the guest computer system; system service monitors for monitoring individual system services which run on the guest operating system; file system monitors for monitoring changes such as reads, writes, and file modifications in the memory and storage of the guest computer system; network interface monitors for measuring all traffic to and from the guest computer system; and network service monitors for monitoring individual network services. The collection of the deception management system monitors and managers 316, 318 collectively monitor and control all aspects of the configuration and operation of the container system service to include all possible modifications of running decoys such as stopping decoys, starting, decoys, reconfiguring decoys, creating new decoys, destroying decoys, modifying the configuration of system or network services, starting or stopping system or network services, or other actions. Further, through interaction with the container system service 301 and its API 304, the managers 316 may perform all actions or procedure which could be normally performed on a computer such as the general-purpose computer illustrated by FIG. 2.

The system 300 of FIG. 4 may also receive information which is transmitted to it via the management network 114 to include detailed information regarding the operating state and properties of the management network 114 or instructions to start, stop, or reconfigure various underlying components, including even adding or removing various monitors 316 or managers 318 as needed to perform various tasks by the deception management system 300. The production network properties can be used by the deception management system 300 to guide the initial configuration and proper deployment of decoys 302.

A disadvantage of honeypot and honeynet deception systems is that the resource costs for creating and managing deception devices which have sufficient fidelity and realism to adequately represent the behaviors and properties of other devices on the network such that an attacker remains fooled is high. Since the primary purposes is often maximizing attacker time spent interacting with the deception, a system administrator will often painstakingly configure the honeypot/honeynet to faithfully represent characteristics of real systems and services, including fake user behavior and history to make an individual honeypot/honeynet appear to be an interesting and valuable attack target. In order to deceive the attacker, a honeypot must generally be able to offer all the interactions of a true target. Deficiencies in the honeypot/honeynet's features or interactions may provide an indication to the attacker of a fake environment. Depending on the level of authenticity used to create and manage the honeypot/honeynet, the cost (e.g. time and labor) of both the initial configuration and the manual maintenance of the honeypot or honeynet may be substantial. Moreover, with no adaption built in to this deception technology, if an attacker suspects the use of a honeypot/honeynet the attacker may be able to use this knowledge to detect peculiar behaviors which are specific to honeypot/honeynet deployments. As a result of their high cost and high value to defenders, existing approaches are unlikely to be used for strategies which "give away" the fact that deception is being used, which precludes a wide array of strategies which are fundamentally important for interfering with attacker actions.

A disadvantage of current deception management systems is that there is no ability to adapt or change the configuration of the deception management system after the system is deployed. Thus, knowledge gained through interactions with a cyber attacker cannot be utilized. Further, there exist challenges in running and managing deception devices in an efficient and scalable manner and maintaining/adjusting these deception devices over time. Although deception device properties may be manually modified based on the properties of the production network, the cost of restarting entire collections of deception devices is expensive and can lead to disclosing the existence of deception devices to an attacker due to abrupt modifications in deception device properties or behavior.

Another disadvantage of current deception management systems is that although methods are provided for creating collections of deception devices to represent themselves as vulnerable or to expose apparent (but false) "attack paths" and to potentially use known attack paths to guide the deployment or redeployment of decoy systems which appear to match, using only known attack techniques and known system vulnerabilities to guide modification of deception device properties and behavior is limiting and can result in situations where no modifications are possible. Additionally, representing attack path of a production network even as collections of decoys can inadvertently disclose known deficiencies in a production network to an attacker.

A particular disadvantage of current deception system systems is that these systems have limited utility in affecting attacker perception of the environment, trust in the veracity of gathered information, or undermining attacker reasoning and cognition. Lastly, and most importantly, existing systems do not provide strategic misinformation based on observed details about the current attack, learn properties of an attacker based on observations of attacker's response to the strategic misinformation, or adapt the system based on observations of attacker behavior.

Thus, there is a need for a system and method for enhancing the protection of a production network. Specifically, there is a need for a system and method which defends against a cyberattack without the configuration and maintenance requirements of high-fidelity honeypots and honeynets. Further, there is a need for a system and method which increases the accuracy and precision of the detection of a cyberattack including detection of zero-day attacks for which neither pattern-based attack detectors nor behavior-based anomaly detectors are available. Such a system, should employ methods which increase both the attacker's cost to perform actions and the attacker's risk of detection. Further still, there is a need for the deception system, the configuration and operative state of which can be automatically adapted based upon real-time observations of an attacker's actions and potentially, through strategic interaction with the attacker. This system must provide protection and detection capabilities at a low cost, against a wide variety of attackers and attack techniques, and be capable of maintaining and improving the deception which is presented to attackers individually and over time.

SUMMARY OF THE INVENTION

This invention provides an adaptive deception system and method for defending a production network from a cyber-attack using an adaptive deception system. The adaptive deception system includes a deception management system in communication with a control system. Properties of the deception network, properties of the production network and observations of an attacker's interaction with the network are provided to the control system. The control system utilizes this information to create a deception function which specifies and adaption specification. Actuators of the control system implement the adaption specification through deception system managers. Thus, feedback is provided to the deception management system allowing the deception management system to be adapted in response to the properties and observations gathered by the control system.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which.

DETAILED DESCRIPTION OF THE INVENTION

Figure 5:
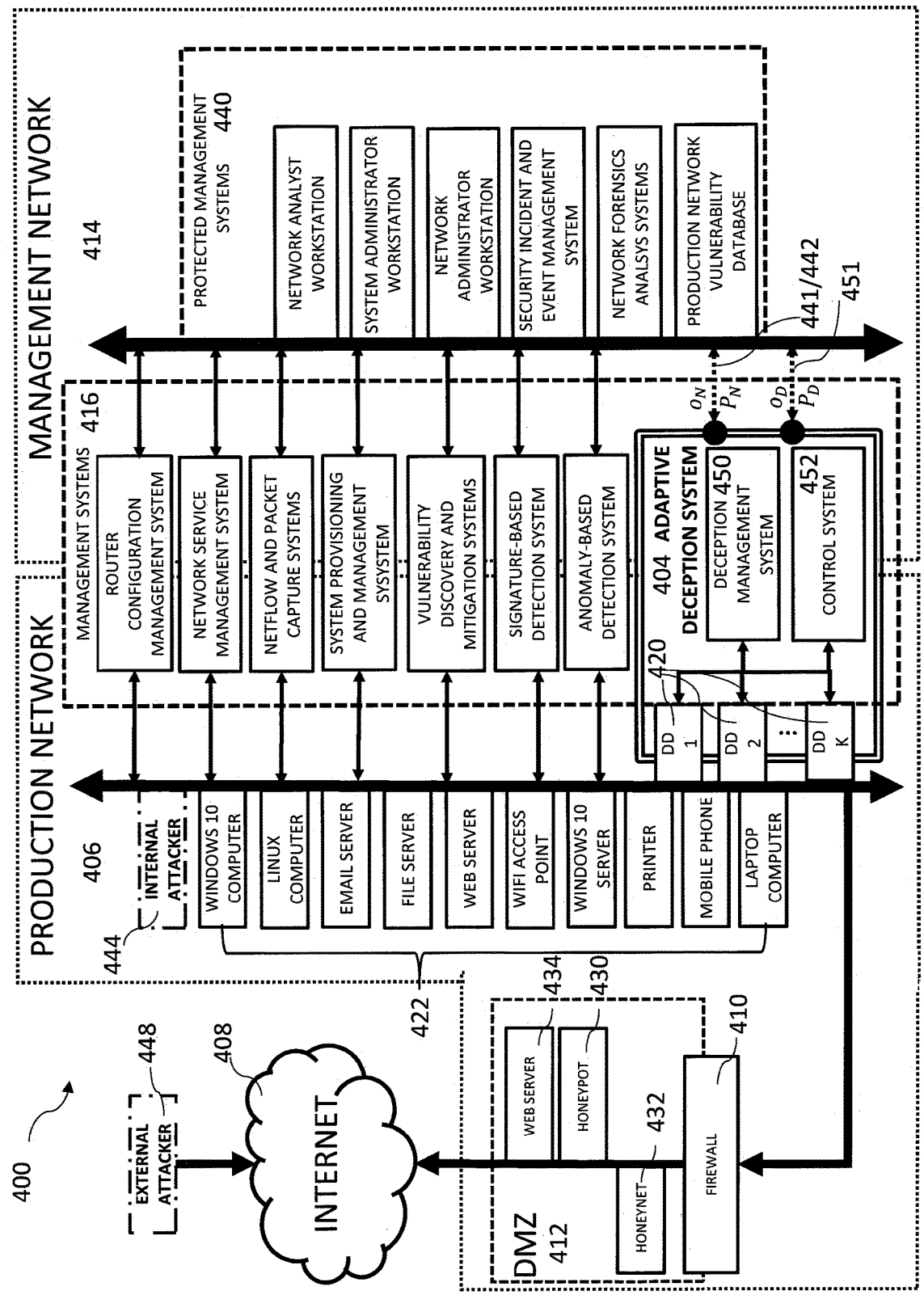
FIG. 5 illustrates an enterprise network including an adaptive deception system of the present invention.

FIG. 5 illustrates an enterprise network 400 including the adaptive deception system 404 of the present invention. The enterprise network 400 generally includes a production network 406 in communication with the Internet 408, a firewall 410, a DMZ 412, a management network 414, management systems 416 and the adaptive deception system 404. As will be discussed in further detail below, the adaptive deception system 404 allows for deployment of deception devices 420 to the production network 406.

As illustrated in FIG. 5, the production network 406 includes production devices 422 commonly connected to a network at a place of business. Production devices 422 include, for example, a WINDOWS 10 operating system computer, a LINUX operating system Linux computer, an email server, a file server, a web server, a Wi-Fi access point, a WINDOWS 10 operating system server, a printer, a mobile phone, or a laptop computer. The production network 406 is used for regular business and computing purposes such as, for example, sending a document to a printer; browsing a website; checking email; or drafting a document. The production network 406 may optionally include many other devices not illustrated, for example devices providing network services such as network routers; network switches; web server network services or file server network services; network routing services to reach other networks; access to wide-area networks such as a business enterprise network; and access to the Internet. Each production device 422 has properties PN defining the production device 422. Properties PN of production devices 422 are provided to the adaptive deception system 404 as illustrated by arrow 442.

Production network access to the Internet 408 is generally provided through the firewall 410 and the demilitarization zone (DMZ) 412. The DMZ 412 represents a region of the enterprise network outside of firewalls and other boundary defenses. As illustrated in FIG. 13A, the DMZ 412 includes a honeypot 430, a honeynet 432, and a webserver 434.

The management network 414 generally includes a plurality of protected management systems 440 including, for example, a network analyst workstation, a system administrator workstation, a network administrator workstation, a security incident and event management system, a network forensics analysis system, and a production network vulnerability database. The management network 440 securely manages each of the devices 422 residing on the production network 406 and protects the production network 406 from malicious interactions. Preferably, the management network 414 and production network 406 are either physically or logically isolated from one another to prevent an attacker from gaining control of the management interfaces of devices 440 on the management network 414 and using this control to compromise systems or information on the production network 406. By using separate networks for management and production purposes, the network communications and business purposes of the production network 406 and its resident systems are more secure.

Management systems 416 of the management network 414 bridge the production and management networks 406, 414. Management systems 416 include for example: a router configuration management system, a network service management system, a netflow and packet capture system, a system provisioning and management system, a vulnerability discovery and mitigation system, and intrusion detection systems, including for example, a signature-based detection system and an anomaly-based detection system. The management systems 416 monitor network and system activities in order to detect attacks and other malicious or potentially malicious activities. These management systems 416 are placed in a manner allowing the management systems 416 to measure activities on the production network 406 and provide alerting and other forms of reporting to various network and system management and security management systems on the management network 414. The management network 414 gathers event logs from individual management systems 416, such as, for example, connection records from routing devices, and alerts from network and host-based sensors such as intrusion detection systems (IDSs). The particulars of data logging, caching, in-memory caching, polling vs. pushing, publication/subscription methods for data record transmission/receipt and communication of data to the management system 416 is provided in accordance with well-known techniques.

The adaptive deception system 404 generally includes a deception management system 450 and a control system 452. As will be discussed in detail below, the deception management system 450 includes many deception devices 420 each having properties $P_D$. As will be discussed in detail below, the deception management system 450 monitors the interactions of an attacker 444/448 with deception devices 420 which have been deployed to the production network 406. This monitoring results in deception management system observations $o_D \in O$ including observations $o_D$ relating to properties $P_D$ of each deception device 420; observations $o_D$ relating to the communications of each deception device 420 with other devices 422 on the production network; and observations relating to interactions by attacker 444/448 with a deception device 420. It is noted that deception management system observations $o_D$ are generated by monitors as textual, categorical, and numeric data which describe the properties of the communications, interactions, or events which were monitored. Each individual observation op represents a subset of the available information which is monitored.

The deception management system 450 of the adaptive deception system 404 is in communication with various management systems 416 and protected management systems 440 of the management network 414. As events and interactions associated with production systems 422 are observed by management systems 416 on the management network 414, management system observations $o_N \in O$ are made. The management system observations $o_N$ are communicated between various management systems 416 and further communicated to the protected management systems 440. Management system observations $o_N$ communicated by a management system 416 may be received by a network administrator, system administrator, or analyst communicating with the protected management systems 440. The administrator or analyst may manually triage each management system observation $o_N$ as an alert indicating malicious activities and may decide how best to respond to the malicious activity and initiate the responsive action. Each individual observation $o_N$ represents a subset of the available information which is monitored. Management system observations $o_N$ include, for example, observed changes in the operating state or configuration of one or more production devices 422 on the production network 406; observations of various events reported via traditional system event logging, observation of interactions on production network 406 made by management systems 416 including signature or anomaly-based intrusion detection systems 416, network flow logs from a network router, observations of suspicious interactions with production devices 422, and observations of interactions with deception devices 420. Each management system observation $o_N \in O$ consists of an individual record of the interaction observed and includes detailed data regarding the interaction such as the identifying information for the production systems 422 involved in the interaction; network flow records from an associated network routing device of the production network 406; raw packet data recorded in its entirety using conventional network packet capture techniques for network data; system event logs associated with the interaction; or system call traces for software instrumentation.

Management system observations $o_N \in O$ made by a management systems 416 concerning production devices 422 on the production network 406 are provided to the adaptive deception system 404 as indicated by arrow 441. More specifically, these management system observations $o_N \in O$ are provided to the control system 452 of the adaptive deception system.

Similarly, deception management system observations $o_D$ and properties of the deception devices $P_D$ are optionally provided by the deception management system 450 to various protected management systems 440 on the management network 414 as illustrated by arrow 451. Further, various management systems 416 on the management network 414, may optionally interact with the deception management system 450 such that the properties of the deception devices $P_D$ may be optionally modified by a management system. Observations $o_D$ and $o_N$ are represented in various formats suitable for communication to the control system 452 and to other management systems 416/440.

As noted above an internal attacker 444 may interact with production devices 422 on the production network 406. Interactions with production devices on the production network may also originate from an external attacker 448. Interactions from these internal/external attackers 444/448 may be either observable or non-observable. Observable interactions consist of those that can be monitored and recognized as being the result of an attacker's interactions with production systems on the production network 406 by a management system 416 and attributed to a particular system or service on the network. Non-observable interactions would be those interactions that may not be monitored by a management system 416. Alternatively, non-observable interactions may be monitored by a management system 416, but may not be recognized as being the result of an attacker's interactions due to being classified by a management system as benign. Non-observable interactions are those for which the adaptive deception system 404 has no ability to observe because no mechanism was present to observe them. Examples of non-observable interactions include certain forms of broadcast traffic which is ignored due to the quantity and likely irrelevance. Certain non-observable interactions may be malicious. For example, a novel attack, for which the signature is unknown and therefore the intrusion detection system 416 or system event monitor is not currently configured to detect. While technically, the interaction may be logged and therefore may be observable, because the interaction is not distinguishable from other interactions on the network, the interaction is classified as unobservable.

Figure 6:
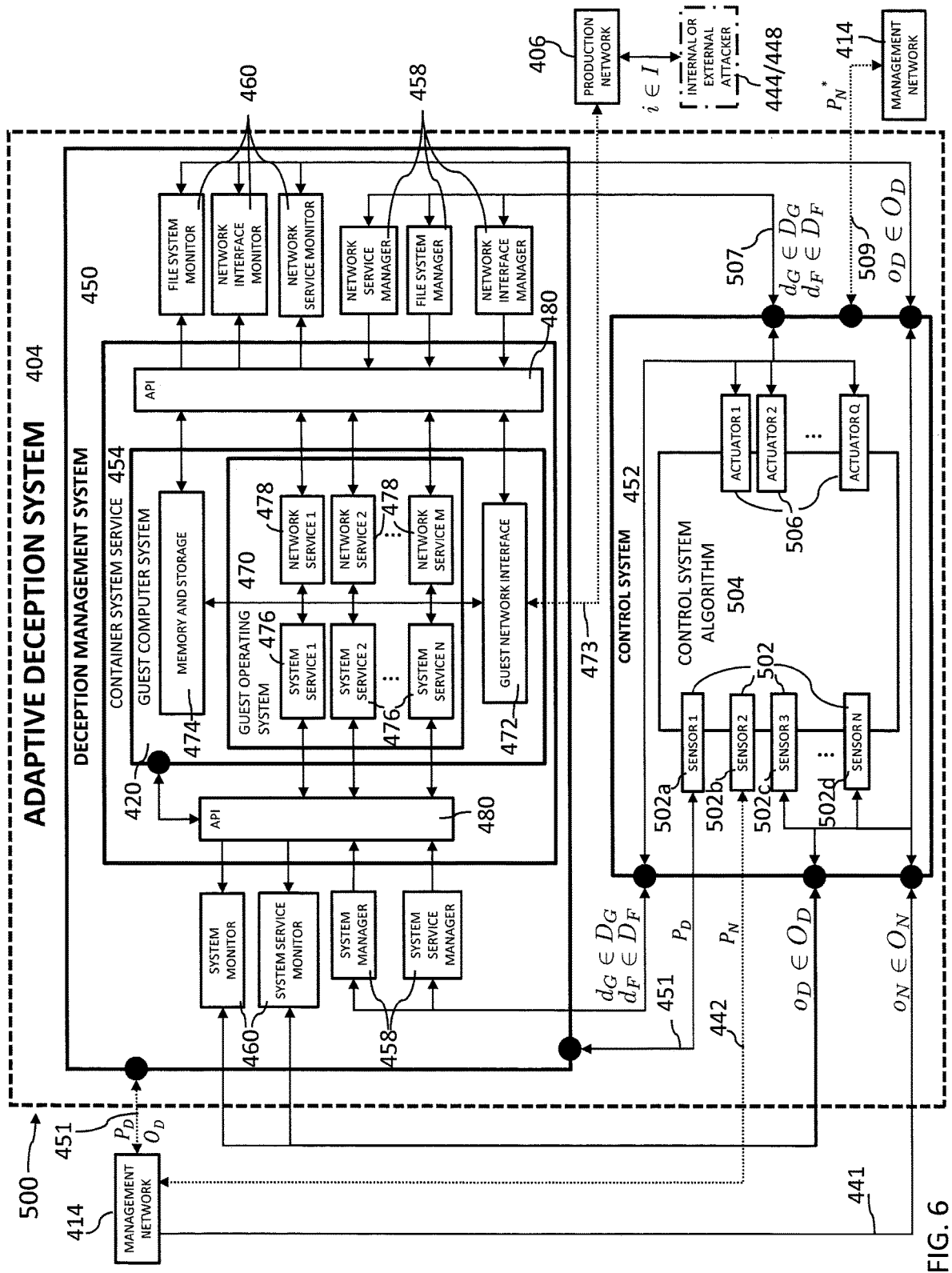
FIG. 6 illustrates an enterprise network including an adaptive deception system of the present invention illustrating the adaptive deception system in greater detail.

The enterprise network 400 of FIG. 5 is illustrated in FIG. 6 which provides additional details of the adaptive deception system 404 including the deception management system 450 and a control system 452.

In addition to communicating management system observations $o_N$ to the protected management systems 440 as discussed above, as illustrated by arrow 441 in FIG. 6, the management systems may also be configured to communicate management system observations $o_N$ to control system 452 of the adaptive deception system 404.

A management system 416 of the management network 414 may also communicate control and data signals directly to the deception management system 450, as indicated by arrow 451, to allow a user of a management system to manage deception devices 420 of the deception management system 450. Automated communication may also occur between a management system 416 and the deception management system 450 for automated management of the deception management system 450 such as for coordination between the deception management system 450 and other management systems 416 of the management network 414.

A protected management system 440 of the management network 414 may also communicate control and data signals directly to the deception management system 450, as indicated by arrow 451, to allow a user of a protected management system to manually manage deception devices 420 of the deception management system 450. Automated communication may also occur between a protected management system 440 and the deception management system 450 for automated management of the deception management system 450 such as for coordination between the deception management system 450 and protected management systems 440 on the management network 414.

The deception management system 450 is a system for hosting guest computer systems. The hosting deception management system 450 runs a traditional host operating system, software applications, system services, and network services. The hosting deception management system 450 runs a container system service 454 that hosts guest computer systems 420. Each guest computer system 420 is a deception device run by the container system service 454 that in turn is run by the hosting guest computer system/deception management system 450.

Although only one deception device 420 is illustrated in FIG. 6, each container system service 454 may run a multitude of deception devices 420. Each deception device 420 generally includes a guest operating system 470, a guest network interface 472 and a memory and storage 474.

The guest operating system 470 runs multiple system services 476 (such as software applications for performing tasks which do not commonly communicate over a computer network such as document editing software) and network services 478 (such as software applications which are intended to interact over a computer network, such as a web browser or a web server network service). These system and network services 476, 478 communicate using various networking protocols and provide access to data or other services via a communications network such as a packet switched network, an IP network, or a cellular communications network. The system services 476 and network services 478 treat the deception device/guest computer system 456 in the same manner as a physical computer system. Each deception device 420 has all of the functionality of a computer system and is treated as if it were indistinguishable from a computer system composed of physical hardware rather than virtual zed or emulated hardware.

The guest network interface 472 of each deception device 420 is a virtual device and provides communication between the deception device 420 and the production network 406. When connection is made between the guest network interface 472 and the production network 406, the deception device 420 is said to be "deployed" to the production network 406 as illustrated by arrow 473. The memory and storage 474 associated with each deception device 420 represents an allocation of underlying host computer system 450 resources such as random-access memory (RAM), disk storage, and network bandwidth.

Although only one container system service 454 is illustrated in FIG. 6, the deception management system 450 may run many container system services 454. The container system service 454 includes AN 480. The container system service 454 is a software application designed to provide a virtualized or emulated computer hardware suitable for running or hosting one or more guest computer systems 420. The container system service 454 provides a means of isolating each guest computer system 420 from the host operating system and from other guest computer systems 420. Methods for ensuring isolation between the host's operating system and guest computer systems 420 and isolation between individual guest computer systems 420 running on the same host are well-known. The memory and storage 474 of the deception device 420 is provided by the container system service 454 which restricts access by the deception device 420 to the computing resources of the deception management system 450. The methods for protecting host system resources through emulation or virtualization are well-known.

The deception management system 450 further includes a collection of managers 458 and monitors 460. The managers 458 and monitors 460 collectively monitor and manage all aspects of the configuration and operation of the container system service 454 including all possible modifications to running deception devices 456 such as, for example, stopping deception devices 420, starting deception devices, reconfiguring deception devices, creating new deception devices, destroying deception devices, installing or removing software, modifying the configuration of a system or network service 476/478 of the deception device 420, or starting or stopping a system or network service 476/478 of a deception device 420.

Managers 458 of the deception management system 450 include, for example: a system manager(s) to manage the guest computer system(s), a system service manager(s) for managing individual system services running in the guest operating system 470; network service manager(s) which manage individual network services; file system manager(s) which manage and manipulate the memory and storage of the guest computer system(s); and network interface managers for manipulating each guest network interface. The running state of any aspect of the guest computer system/deception device 420 and its running operating system or software may be modified in any way desired by this collection of managers 458.

Each deception device 420 is monitored by one or more monitors 460 of the deception management system 450. Monitors 460 include, for example: system monitor 460 for monitoring the running state of the deception device 420; system service monitor 460 for monitoring individual system services which run on the deception device operating system 470; file system monitor 460 for monitoring changes such as reads, writes, and file modifications in the memory and storage 474 of the deception device 420; network interface monitor 460 for measuring all traffic to and from the deception device 420; and network service monitor 460 for monitoring individual network services. The monitors 460 of the deception management system 450 measure the internal aspects of the container system service 454, deception devices 420, and each of the system services 476 and network services 478 of the deception device operating system 470. Deception management system observations $o_D \in O$ include observations relating to the communications of any deception device 420 with any production device 422 including observations relating to interactions by attacker 444/448 with a deception device 420. Deception management system observations $o_D$ also include observations relating to deception device operating system 470 events such as the starting or stopping of software. Deception management system observations $o_D$ also include observations relating to event reporting and error reporting events which are created by system and network services 476/478 which are running on the guest operating system 470.

Deception management system observations $o_D$ are made by a monitor 460 when such operating system events and service events are reported such as each time the state of a service 476/478 is changed or is modified, or each time a service 476/478 logs data within the guest operating system 470 of the deception device 420. Deception management system observations on are also made by 420 and/or the services 476/478 run by the deception device 420, or when the deception device 420 communicates with other production device 422. Each deception management system observations on is a record of data which is produced by a monitor 460 of the deception management system. Each record of data relating to the internal states of the deception device 420, or the communication between a deception device 420 and a production device 422, or the attacker's interaction with the deception device 420. The data provided by the deception management observation $o_D$ and the method used for processing, caching and/or logging of this data is dependent upon the particular configuration of software or hardware associated with the deception device and a traditional data structure suitable for the data collected is used.

As discussed below, data relating to the deception management system observations $o_D$ is delivered to sensors 502 of the control system 452a using a variety of well-known processes. When observations need to be delivered quickly (i.e. in real time), one process provides that the data related to an individual observation made by the monitor 460 is immediately passed to the sensor 502 of the control system. In another process, the monitor 460 waits until receiving a request from a sensor 502 and provides observations only upon request. Other processes provide for the collection of data prior to delivery. For example, data related to observations made by the monitor 460 may be cached in volatile memory and flushed through a blocking or non-blocking queue at first opportunity. In another process, data is cached in memory for a particular period of time and only provided to the sensor 502 via a monitor 460 upon a request from the sensor 502. In the event no request is made, the data is dropped. In yet another process, data is cached in a ring buffer or similarly limited queue, where once the queue is full, old data is overwritten. In still yet another process, data is immediately written to a log file and later read and processed by a monitor 460 to determine if patterns are present which should be forwarded to a sensor 502.

As noted above, the memory 474 associated with each deception device 420 is used to store information regarding the interactions between the deception device 420 and the production device 422. In some instances, such information may be stored in a log file. Preferably, sufficient storage is provided by the deception management system 450 for the use of such log files such that information can be retained for a significant period of time relating to both immediate interactions over the last few minutes, but also extending to hours, days, weeks, months, and even years.

Figure 1:
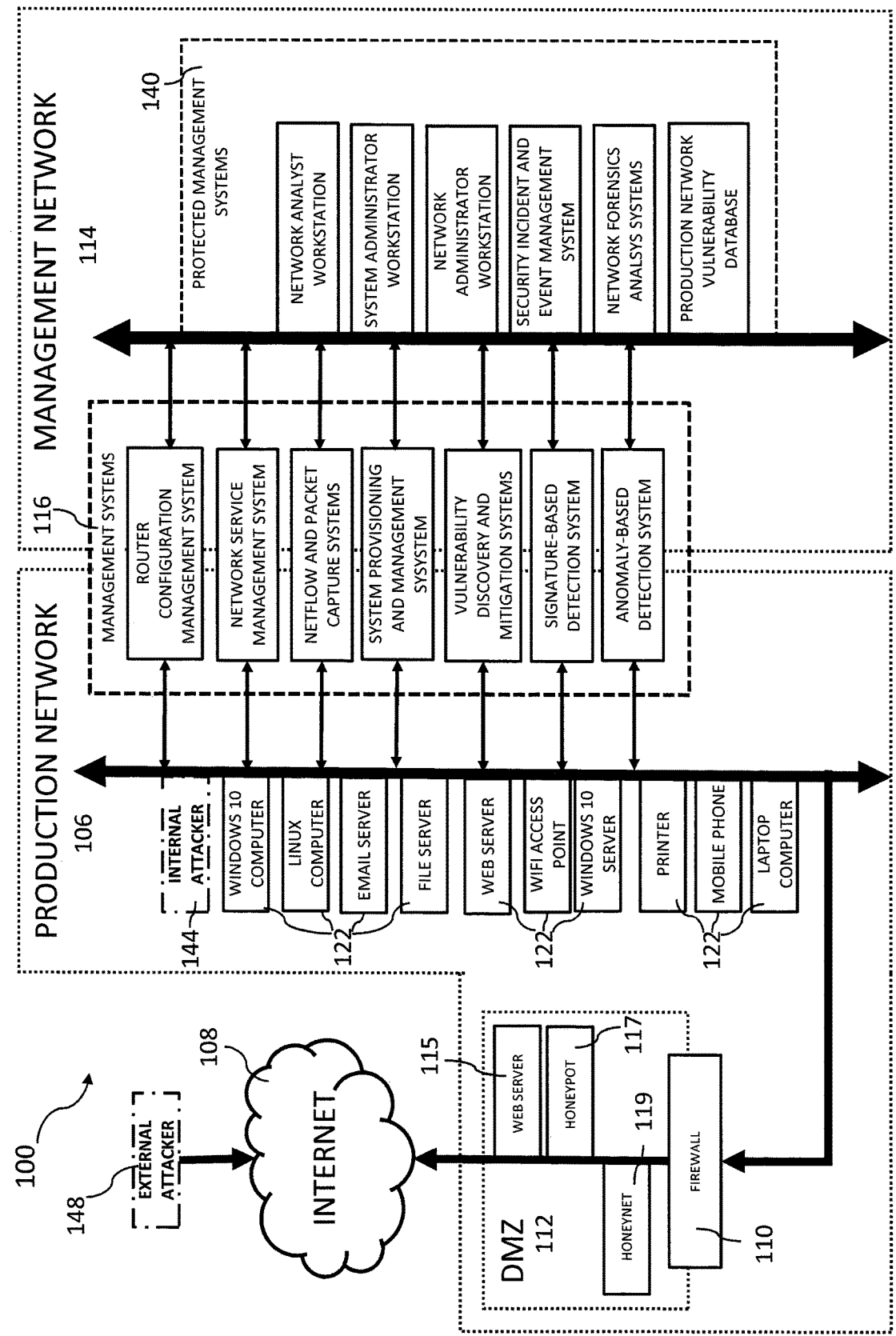
FIG. 1 illustrates a prior art production network and management network in communication the internet.
Figure 2:
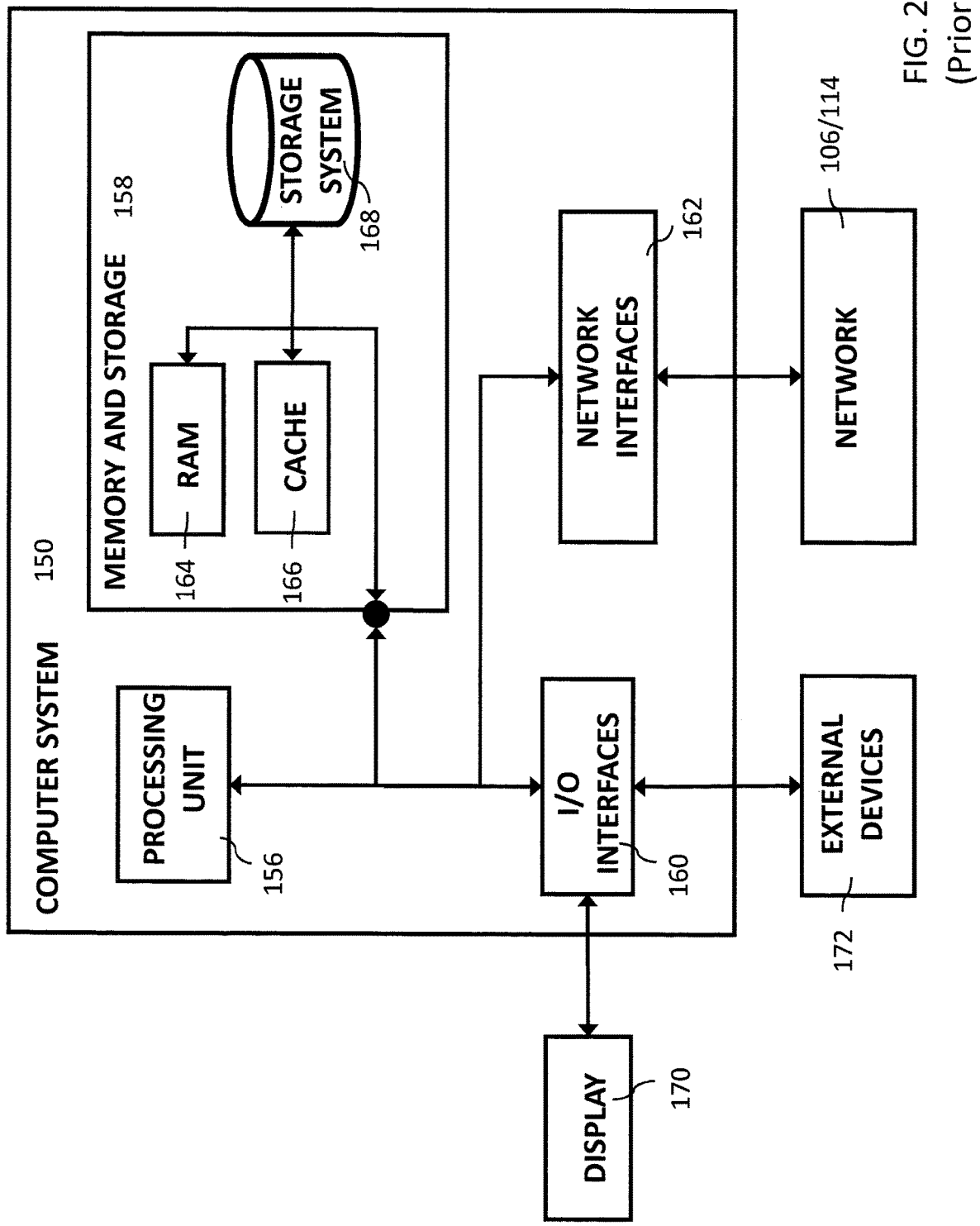
FIG. 2 illustrates a prior art basic computer system architecture.
Figure 3:
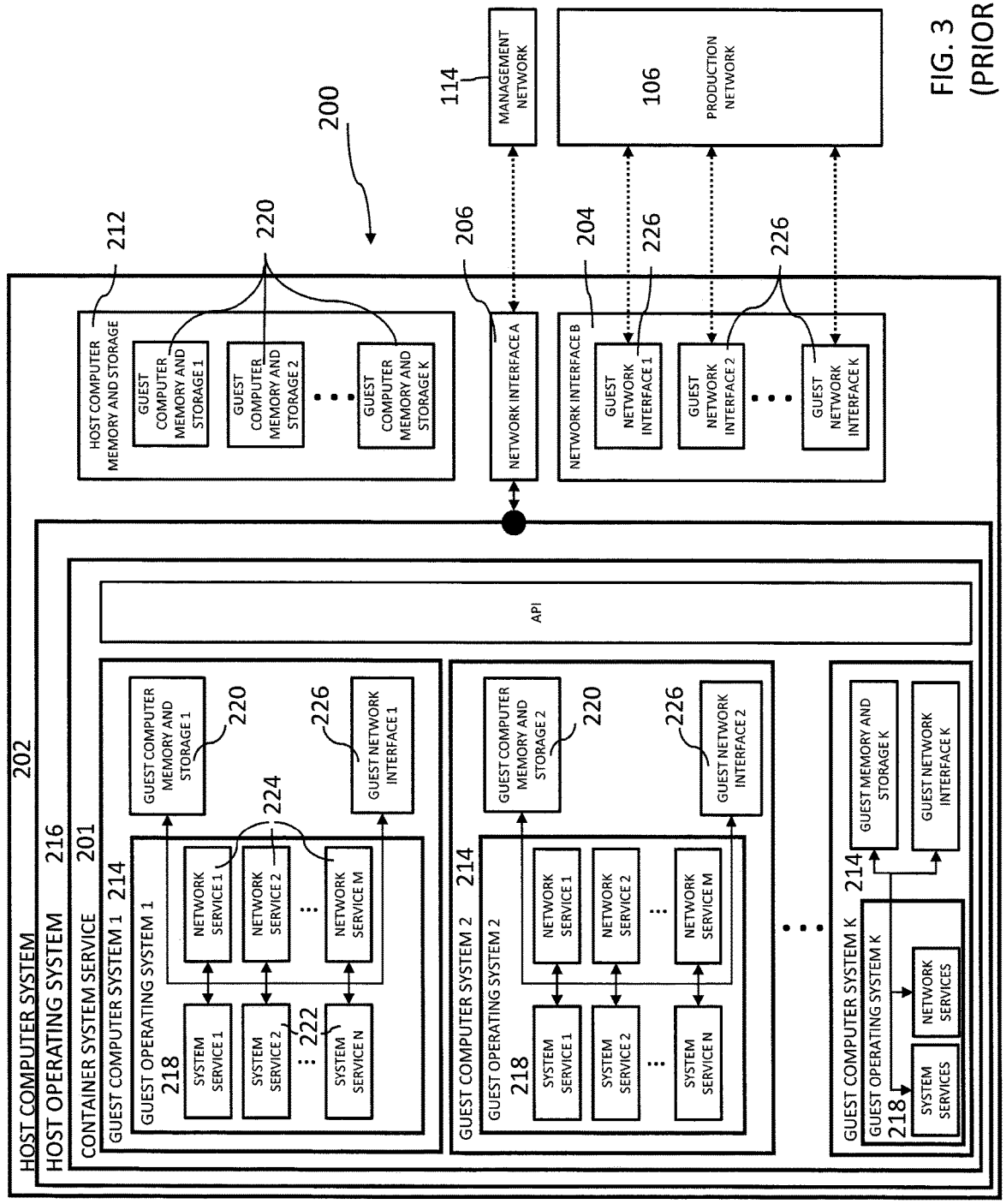
FIG. 3 illustrates a prior art physical computer system used for hosting guest computer systems.
Figure 4:
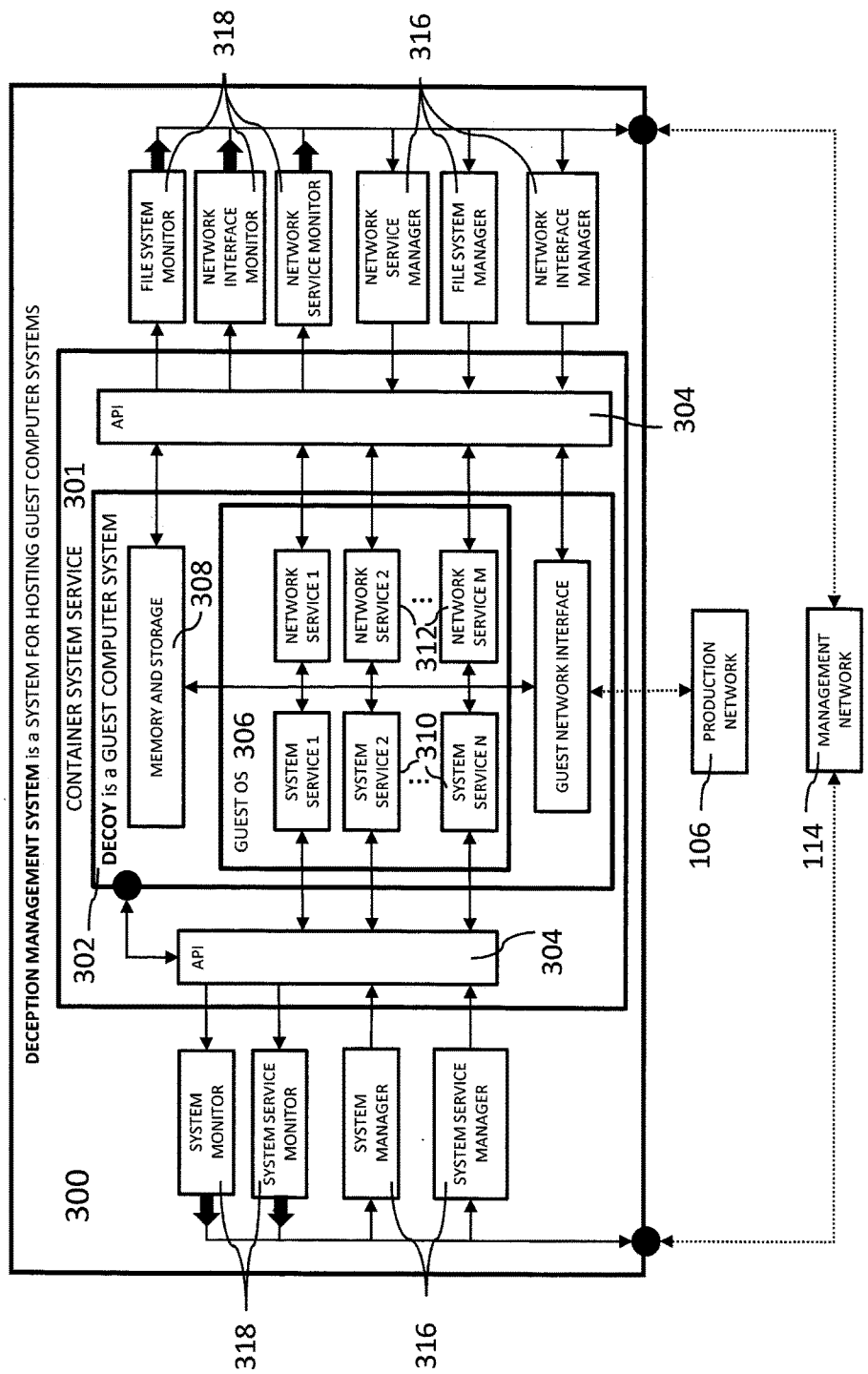
FIG. 4 illustrates a prior art deception management system which runs one or more deception devices, each independently connected to a production network.

The container system service API 480 interacts with the managers 458 of the deception management system 450 to perform all actions or procedures that could normally be performed on a computer such as the general-purpose computer of FIG. 1. For example, interactions between the container system API 480 and the mangers 458 allows for modification of the running state and configuration of each deception device 456. The container system API 480 interacts with the monitors 460 of the deception management system 450 to monitor each internal component of the deception device 420, the guest operating system 470, the system services 476 and network services 478 running on the guest operating system 470, each of the network interfaces 472, and accesses to memory and storage 474 including the monitoring of log data and system events. The interaction between each monitor 460 and API 480 is configured to either provide information upon request, to provide information at regular polling intervals, or to provide information based upon particular criteria such as the presence or absence of a string pattern in a log file. Methods for instrumenting operating systems and software are well-known.

As illustrated in FIG. 6, the adaptive deception system 404 includes a control system 452. The control system 452 generally includes a variety of sensors 502, a control system algorithm 504, and actuators 506.

Each sensor 502 of control system 452a receives data. For example, a sensor(s) 502a receive data regarding the deception devices properties $P_D$ from the deception management system 450; a sensor(s) 502b receive data regarding properties of the production network $P_N$ from the management network 414; a sensor(s) 502c receive data provided by the deception management system observations $o_D$ from the deception management system 450; and a sensor(s) 502d receive data provided by the management system observations $o_N$ from the management network 414.

These observations $o_D$ and $o_N$ are received by the control system 452. The control system 452 runs a control system algorithm which processes the observations $o_D$ and $o_N$, the deception device properties $P_D$, and the production device properties $P_N$ and produces as an output an adaption specification $D_F$ and optionally a hypothesis test adaption specification $D_G$ for deception devices 420 and production devices 422. The adaption specification $D_F$; defines adaptions to be implemented by deception management system 450 which results in the modification of the properties $P_D$ of the deception devices 420 and/or modification to properties $P_N$ of the production devices 422. The hypothesis test adaption specification $D_G$, defines the hypothesis test adaption to be implemented by the deception management system 450 which results in the modification of the properties $P_D$ of the deception devices 420 and/or modification to properties $P_N$ of the production devices 422 for the purpose of testing a selected hypothesis. As illustrated by the arrow 507, the adaption $D_F$ and optionally the hypothesis adaption $D_G$ is provided to the deception management system 450 to implement the specified adaption. The adaption implemented by the deception management system is generally intended to impede attacker progress and interfere with various actions that the attacker 444/448 may perform. An adaption implemented by the deception management system 450 may include, for example, changes to the configuration of currently deployed deception devices 420; the deployment of deception devices to the production network 406; the removal of deception devices from the production network 406; the modification of a deception device property $P_D$, such as for example, which services are running on the deception device 420; causing intermittent failure of a network connection of a deception device 420; increasing latency of a network connection of a deception devices 420; spoofing of a network connection of a production device 422; spoofing of a network connection of a deception device; or the simulated failure or crashing of a deception device 420.

Each actuator 506 of control system 452a receives commands from the control system algorithm 504 in the form of the adaption specifications, $D_F$ or $D_G$, and implements each received adaption specification by communicating with a manager(s) 458 of the deception management system 450. Adaption specifications $D_F$ and $D_G$ are communicated in a manner suitable for implementation by a manager(s) 458 of the deception management system 450. Actuators 506 may send multiple commands to multiple managers 458 in a coordinated fashion to implement a particular adaption specification. Actuators 506 may also perform bi-directional communication with managers 458 to verify that each adaption specification $D_F$ and $D_G$ is implemented by a manager(s) 458.

Optionally, as illustrated by the arrow 509, the algorithms 504 may provide commands to the actuators 506 to provide updated production device properties $P_N^*$ to the management network 414 to implement updates to the production devices 422 of the production network 406. For example, a firewall actuator would communication new firewall settings to the firewall associated with the production network 506.

The control system algorithm 504 performs computations which map sensor inputs to a selection of appropriate actuators and coordinates timing of actuator execution to achieve a particular adaption. The control system algorithm 504 of control system 452 of the adaptive deception system 404 may be provided by a variety of methods, including for example, a rule-based decision procedure, a Markov process, a partially-observable Markov decision procedure, an autonomic reasoning system, a reinforcement learning system, or a convolutional neural network.

Figure 7:
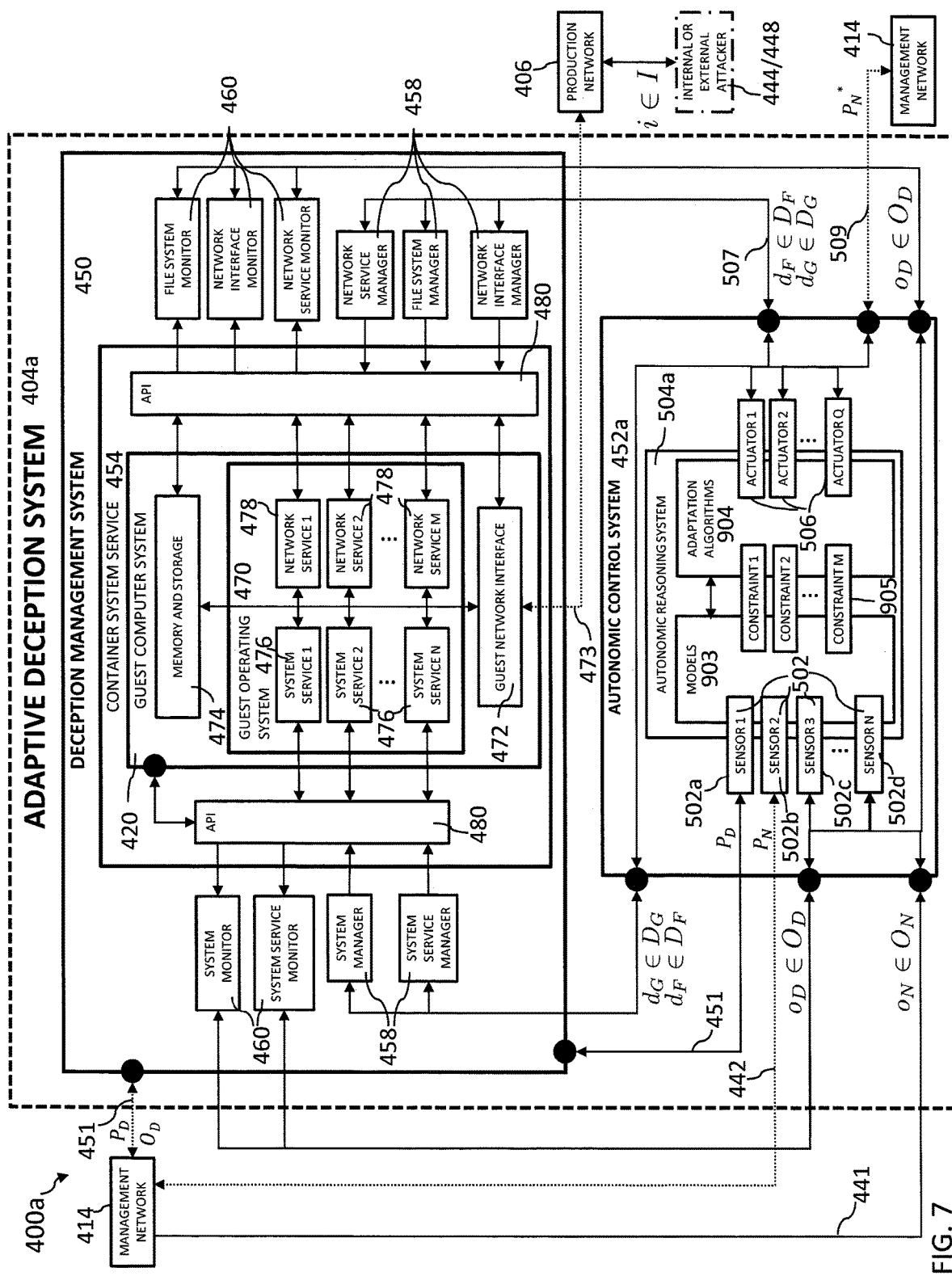
FIG. 7 illustrates an enterprise network including an adaptive deception system of the present invention including an autonomic control system.

FIG. 7 illustrates an enterprise network 400a including an adaptive deception system 404a. The adaptive deception system 404a is the same as the adaptive deception system 404 illustrated in FIGS. 5 and 6 except that the control system 452 of the adaptive deception system 404 is provided by an autonomic control system 452a. More specifically, in the adaptive deception system 404a the control system algorithm 504 is provided by an autonomic reasoning system 504a. We term the control system having an autonomic reasoning system 504a as its control system algorithm to be an autonomic control system 452a. The autonomic reasoning system 504a includes model(s) 903, adaption algorithm(s) 904, and constraint(s) 905. Further, the autonomic reasoning system 504a is in communication with each sensor 502 of the autonomic control system 452a such that data can be read or written to each sensor 502. Further, the autonomic reasoning system 504a is in communication with each actuator 506 such that data can be read or written to each actuator 506.

As noted above, deception management system observations $o_D \in O$ are made by the monitors 460 of the deception management system 450. Each monitor 460 is in communication with one or more sensors 502c of the autonomic control system 452a and provide the observations $o_D \in O$ to the sensor(s). The sensors 502c process the observations $o_D$ and the observations $o_D$ are represented in a model 903. For example, a file system monitor observes various files within each deception device and observations $o_D$ relating to patterns within each file or activities associated with each file are made by the monitor 460 of the deception management system 450 and are provided to the sensor 502 which process the observations and provides the observation $o_D$ to a model 903. In another example, an attempt to connect to an SSH server on a particular port is observed by a file system monitor 460 and observations $o_D$ relating to such login attempt, including data relating to the timing, and connection information are communicated to one or more sensors 502 of the autonomic control system 452a which process the observation(s) and provides the observation(s) to a model 903 of the autonomic reasoning system 504a. The models 903 of the autonomic reasoning system 504a are created using well-known techniques.

As also noted above, management system observations $o_N \in O$ are made by the management system 414. Sensor(s) 502 of the autonomic control system 452a receive these management system observations $o_N$, process the observations $o_N$ and provide the observations to the models 903.

As the sensor(s) 502c of the autonomic control system 452a receive the individual deception management system observations $o_D$ and the sensor(s) 502 receive the individual management system observations $o_N$, derived observations may be made from the individual deception management system observations $o_D$ and the individual management system observations $o_N$ which are also provided to the models. For example, the collection may include an individual deception management system observation $o_D$ "Device 1 with IP Address 192.168.1.5 connected to Decoy 5 at 3 pm on 4 Jun. 2020". The model may further include an individual deception management system observation $o_D$ providing categorical information (such as "Operating System of Decoy 1 is Debian Linux") or numeric information such as those relating to the operating states or properties of systems and services (such as "Service WinRM of Decoy 1 was interacted with 30 seconds ago"). Derived observations provided to the model, may include, for example, statistical representations of numeric data such "Attacker 1 has sent 1023 packets to Decoy 1 in the last 5 minutes". As another example, derived observation provided to the collection may include, for example, a cumulative tally of the number of packets that were observed to have been sent to each individual deception device/decoy, to which service ports these packets were transmitted, whether a connection was established, any associated features of the interaction which were observable (such as IP addresses and MAC addresses of the devices involved in the interaction), timing data relating to when each connection was made, and data specifying the frequency and distribution of interactions over time. In yet another example, a derived observation provided to the model, may include statistical aggregation of the properties of observations.

Another example of derived observations includes attacker observations. Sensors may be configured, for example, to translate individual deception management system observations $o_D$ to a derived observation representing a particular attacker a, A derived attacker observations includes for example, details such as the IP address from which an attacker a communicated, each production device that the attacker a interacted with, each deception device that the attacker a interacted with, the times of each interaction, and information from various management systems regarding any notable events or alerts that these interactions resulted in.

Thus, the data provided by the model 903 includes observations $o \in O$ (including deception management system observations $o_D$, management system observations $o_N$ and derived observations); properties $P_D$ and $P_N$. The model represents various properties of the production devices $P_N$ and deception devices $P_D$. The model also represents various properties of observations $o_D$ and $o_N$. Many underlying representations may be used within the model of the autonomic reasoning system 504a. In accordance with well-known techniques, for example, a graph-based representation may be used as a model wherein the nodes of the graph-based representation represent observations O, or properties $P_D$ or $P_N$ and each edge of the graph-based representations represents relational information of the nodes. Whether each of the observations in O are individually represented in the graph-based model or are abstracted as a derived observation depends on the source and particular data of the observation, the particular configuration for the sensor, available representations in the model, the frequency that the particular observation is made, and whether each observation conveys new information or are duplicative of information already represented in the model. In general, most raw data of each observation is discarded and only salient information is retained in the model. Information is considered salient if there exist constraints and actuators which make use of the information for decision making (as will be discussed below).

As an alternative to creating a model using the data provided by the sensors, a model can be constructed manually through inspection of the production network and cataloguing of devices and device properties.

Multiple models may be connected together to form larger models.

The autonomic reasoning system 504a includes a number of pre-defined constraints 905. The constraints are rules which are expressed as predicates over properties and objects of the model(s) 903. These rules may be complex expressions representing relationships within the model; they may be Boolean expressions relating to the existence of particular observations with specific systems on the network; or they may be boundary conditions over parameters of various model components. The specific constraints used depend on the construction of the particular types of systems likely to be present on the network and the expected normal operation of these systems. Constraints may be "negative". In the case of a negative constraint, failure of a condition to occur results in satisfaction of the constraint. In the case of a negative constraint, failure of a condition to occur results in satisfaction of the constraint. In either case, the constraint has been satisfied, which can trigger further action.

When a constraint is satisfied, execution of at least one adaption algorithm 904 is triggered. A number of adaption algorithms 904 including adaption functions F are provided by the control system for computing a mapping of the data received by sensors 502 to provide an adaption specification. $D_F$. Optionally the adaption algorithm(s) 904 provide a hypothesis test adaption function G which computes a mapping of the data received by the sensors 502 to provide a hypothesis test adaption specification $D_G$. Optionally further, the algorithms 904 may provide updated properties $P_N^*$ to be provided to the management network 414 to implement the updates to the production devices 422 of the production network 406.

The general form of the adaption function F of the adaption algorithm 904 is $F(P_D, P_N, O)$. The function F takes as input the sets of deception device properties $P_D$, the production device properties $P_N$, and a set of observation O of the network and deception device interactions. The output of function F is a specification of the adaptions to be performed, $D_F$. The adaptions to be performed $D_F$ as determined by the adaption function F interfere with the attackers whose interactions have been observed. Function F operates directly over the set of constraints 905, the objects and relationships represented by the graph-based model, and the set of available actuators 506 used for implementing the adaptions. An example of a calculation of function, $F(P_D, P_N, O)$, provided by a control system algorithm is described in pseudo-code Listing 1 and pseudo-code Listing 2. Pseudo-code of Listing 1 provides:

Listing 1 - calculation of adaption
function with observation-driven adaptions
Calculate $\mathcal{F}(P_D, P_N, O)$

```
 1:  D_{P_N} = dictionary(Key(Integer,Integer) → Value(Float))
 2:  for all i ∈ P_N.IDSET do
 3:      for all j ∈ P_D.IDSET do
 4:          if i ∈ O.IDSET and j ∈ O.IDSET then
 5:              // ADAPT_3: Observations relate to both a network element
                    and a deception element
 6:              adapt3(P_D[j], O[j], P_N[i], O[i])
 7:          else if j ∈ O.IDSET then
 8:              // ADAPT_2: Observations relate to a deception element,
                    but not network element
 9:              adapt2(P_D[i], O[j])
10:          else if i ∈ O.IDSET then
11:              // ADAPT_1: Observations relate to a network element, but
                    not a deception element
12:              adapt1(P_N[i], O[i])
```

-continued

Listing 1 - calculation of adaption
function with observation-driven adaptions
Calculate $\mathcal{F}(P_D, P_N, O)$

```
13:          end if
14:          v ← fitness (P_N[i], P_D[j])
15:          D_{P_N}.put ((i, j), v)
16:      end for
17:  end for
18:  return D_{P_N}
```

In one block of Listing 1 labeled ADAPT_3, for example, if an observation relates to both a production network and an existing deception device (such as an attacker sequentially scanning both decoy devices and production devices), the adapt3 block provided in Listing 3 is performed in order to interfere with attacker interactions. The functions adapt2 and adapt1 have a similar structure and can be considered to be a subset of adapt3, but where the adaption is triggered by the satisfaction of constraints 905 related to observations of interactions with only one of a deception device 420 or a production device 422. These functions adapt2 and adapt1 are provided in the listing as in some implementations the method for adapting elements of the adaptive deception system 404 when interactions occur solely with production devices 422 or when interactions occur solely with deception devices 420 differ from the adaptions which take into account simultaneous interactions with the production network 406 and the deception Listing 2 - adaption function for performing selection of
adaptions based on observations affecting real and decoy systems
Calculate adapt3($p_d$, $o_d$, $p_n$, $o_n$)

```
 1:  if o_d ∧ o_n ∈ HostEnumerationAttacks then
 2:      t1a = chooseTactic(t ∈ T|post-cond(t → p_d) == delay)
 3:      // Results in: t1a ∈ {ADD_DECOY, ADD_RESPONDER,
            TC_DELAY, NULL}
 4:      applyTactic(t1a, p_d)
 5:      t1b = chooseTactic(t ∈ T|post-cond(t → p_n) == delay|deny)
 6:      // Results in: t1a ∈ {ADD_DECOY, ADD_RESPONDER,
            TC_DELAY,TCP RESET, NULL}
 7:      applyTactic(t1b, p_n)
 8:  else if od ∨ o_n ∈ PortScanAttacks then
 9:      t2 = chooseTactic(t ∈ T|post-cond(t → p_d) == degrade)
10:      // Results in: t1 ∈ {ADD_DECOY, MODIFY_DECOY,
            ADD_RESPONDER, TC_DELAY, NULL}
11:      applyTactic(t2, p_d)
12:  else if o_d ∈ Intrusion Attacks then
13:      t3 = chooseTactic(t ∈ T|post-cond(t → p_d) == deny)
14:      // Results in: t3 ∈ {TC_DELAY|TCP_RESET|
            REMOVE_DECOY|NULL}
15:      if t3 == TCP_RESET then
16:          applyTactic(t3, p_n)
17:      else
18:          applyTactic(t3, p_d)
19:      end if
20:  else
21:      t0 = choose Tactic(t ∈ T|post-cond(t → p_d) == learn)
22:      // Results in: t0 ∈ {ADD_DECOY|MODIFY_DECOY|
            REMOVE_DECOY|NULL}
23:      apply Tactic(t0, p_n)
24:  end if
``` devices 420. For example, if the observation relates to a production device 422 and production device properties, $P_N$, the adaption may be to communicate with a management system 416/440 on the management network 414 such that the management system 416/440 modifies the production device 422 to protect it from the actions of the attacker.

The adapt3 function is illustrated in Listing 2. The adapt3 function of Listing 2 selects the particular adaption $D_F$ using the following method: selecting a branch of the adaption algorithm based on the type of attack indicated by the observations (e.g., a Host Enumeration Attack, a Port Scan Attack, or an Intrusion Attack) and whether a real system or a decoy is associated with the attacker activities. A comparison of available interference tactics t∈T is made against the postcondition associated with each tactic including "delay", "degrade", "deny", or "learn". The branch of the adaption algorithm to be executed is determined by the desired post condition. In the adapt3 function, each "tactic" identifies the specification of the adaption to be performed $d_F \in D_F$. The specification of the adaption $D_F$ is represented by a data structure indicating which actuator will implement the adaption and the expected post-condition of performing the adaption. As such, in this example, each tactic in the adapt3 algorithm is mapped to a specific actuator 506 of the autonomic control system 452a by the call to "applyTactic". "applyTactic" directly executes the selected tactic by executing an associated actuator(s) which in turn communicates the new specification of the adaption $d_F$ to the associated manager 458 of the deception management system 450. It is noted that the algorithm 904 may provide the specification of the adaption $d_F$ to any number of actuators 506.

In the first branch of the adapt3 function, both the decoy observation and real system observation are determined to be "host enumeration attacks". If the observation is not determined to be a host enumeration attack, then this branch is skipped. In the second branch if either one of the observations is a "port scan attack" and the system is a production device or a deception device, then the branch will be executed. In the third branch, it is sufficient for the decoy to be an "intrusion attack" against a deception device 420.

Listing 2 further illustrates the use of a tactic selection function, chooseTactic, selects a tactic t∈T where a postcondition criterion is met. In the preferred embodiment this tactic selection function is best implemented as a non-deterministic algorithm that takes into account the prior success or failure of prior adaptions by adjusting the probability of selecting any given tactic meeting the specified criteria. In the program listing, the function chooses a tactic which meets the specified post-condition criteria, meaning that when the tactic is applied to the parameters of the system through the execution of an actuator it is expected that it will result in the given post-condition. The tactic selection function can also require pre-conditions over the input systems, but this is left out for brevity and can be easily implemented within the tactic application function, applyTactic.

Adapt3 completes each branch by calling "applyTactic" and providing both the selected tactic and a specification of the properties to be implemented. For purposes of brevity it should be understood that each tactic (e.g. ADD_DECOY, REMOVE_DECOY, TC_DELAY) is mapped directly to an actuator which performs the requested action.

It should be clear to one skilled in the art that Listing 2 provides a straight-forward mechanism to enable the use of a user-selected goal to be used to restrict the operation of the adapt3 function to branches the post-condition associated with the user-selected goal.

In other embodiments, the algorithm of Listing 2 may be extended to include branches which perform combinations of multiple adaptions. Further, combination of adaptions may also be performed simultaneously or in sequence.

The algorithm shown in Listing 3 should be understood to be an example of a small set of adaptions and is not intended to be exhaustive of all possible adaptions that are likely to be implemented in a complete system. A preferred embodiment will have a set of various tactics defined to execute various actuators 506, numerous strategies and a large number of defined tactics. Also left unspecified here is exactly which deception device 420 would be added, what the modification would be, or what the configuration would be of the various strategies such as PORT_SPOOF or TC_DELAY. In general, the configuration of each of these is obtained from the properties provided to the adaption function as they each relate to the network and configuration properties found in $P_N$ and $P_D$.

The adaptions provided by Listing 2 specify the $D_F$ to be implemented by the actuators 506. More specifically, the autonomic reasoning system 504a communicates the selected adaptions to the deception management system 450 using one or more actuators 506. Specific actuators 506 implement particular portions of the adaption $D_F$ and communicate particular portion of $D_F$ to particular managers suitable for implementing the selected adaptions.

For example, a file deletion actuator 506 would communicate with a file system manager 458 to cause the file system manager 458 to perform the action of deleting a specific file. Similarly, a network degradation actuator 506 would communicate with a network service manager 458 to perform the action of degrading the network connection specified by the network degradation actuator 506. Other actuators 506 include but are not limited to: system service termination actuator 506; software installation actuator 506; change IP address actuator 506; decoy deletion actuator 506; etc. Any action which can be performed by the deception management system 450 will have an associated actuator 506 if these actions are deemed suitable or useful for adapting one or more deception devices 420.

Production system actuator 506 is in communication with management systems 416/440 of the management network 414 to receive adaptions $P_N^*$ to be made to the production network. For example, a firewall actuator would communication new firewall settings to the firewall associated with the production network 506.

Each of the control system described, 452a provide feedback to the deception management system 450 by utilizing the observations, O, output by the deception management system to specify adaptions $d_F \in D_F$ which are fed back to the deception management system 450 via the mangers 458. This feedback loop occurs concurrently and asynchronously with the processing which may occur in one or more management system 416 which is receiving the same sets of observations of attacker interactions. The operation of individual elements of the adaptive deception system 404 is performed such that processing of new sensor inputs, the testing of constraints 905, the execution of one or more adaption algorithms 904 triggered by one or more constraints 905, and the execution of one or more actuators 506 each occurs asynchronously. Data is received and updated, and adaptions are performed as new data is consumed. Further, the operation of each sensor 502 is performed independently and asynchronously from the operation of each of the other sensors 502 as is the operation of each of the actuators 506 when the action of such actuators is activated by independent executions of the adaption algorithm 904. Conversely, a single execution of the adaption algorithm 904 can synchronously execute multiple actuators 506. Similarly, a single sensor may synchronously communicate with multiple monitors 458 in order to use observations from multiple sources and to correlate or corroborate the individual observations.

The autonomic reasoning system 504a allows continuous analysis of the collection of models 903 as the models are being constructed and updated; to determine if based on the current collection of models 903 whether any of its defined constraints 905 has been satisfied; to trigger the execution of one or more adaption algorithms 904 when a constraint 905 is satisfied; to automatically specify one or more adaptions $d_F \in D_F$ based upon the models 903, the constraints 905, and the available actuators 506; and to implement the selected action through direct communication with one or more managers 458 of the deception management system 450.

An example of a constraint being satisfied is provided in the context of observations. In some instances, a constraint is satisfied upon observation of a change in an attacker's behavior. In other instances, a constraint is satisfied when steady-state behavior of an attacker is observed (i.e., no change in the attacker's behavior). In yet other instances a constraint is satisfied in the absence of a particular observation. For example, when an attacker ceases interaction with a particular deception device, the absence of the attacker interaction may result in satisfaction of a constraint.

When a constraint is satisfied, execution of at least one adaption algorithm 904 is triggered. A number of adaption algorithms 904 including, adaption function F are provided by the autonomic control system for computing a mapping of the data received by sensors 502 as represented by the models 903 to provide an adaption specification $D_F$. Optionally the adaption algorithm(s) 904 provide a hypothesis test adaption function G which computes a mapping of the data received by the sensors 502 to provide a hypothesis test adaption specification $D_G$.

Actuators 506 receive the adaption specification $D_F$ and/or the hypothesis test adaption specification $D_G$ and communicate the specifications to the deception system managers 458 of the deception management system 450 to implement the adaption specification.

As the sensors 502 continue to receive data, mapping of the data continues and new adaption specifications $D_F$ and/or hypothesis test adaption specifications $D_G$ are provided to the actuators 506 and implemented by the managers 458 to provide real-time adaption of deception devices 420, including for example, adaption of the properties $P_D$ of the deception devices 420, adaption of the configurations of the deception devices 420, and adaption of the operating states of the deception devices 420. These real-time adaptions provide effective interaction with attackers on the network such that the attacker is hindered in making forward progress or dissuaded from continuing malicious interactions with systems on the production network.

As noted above, the adaption specification may include a hypothesis test adaption specification. The hypothesis test adaption specification is provided by a hypothesis test adaption function G of the adaption algorithms 504. The hypothesis test adaption function is optionally provided to modify the configuration or behavior of one or more deception devices 420 to perform an experimentally controlled test of the suitability of a particular adaption specification $D_F$ against a particular attacker in a particular production network 406.

Although an in-depth description of control system utilizing an autonomic reasoning system is provided above in connection with FIG. 7, it is to be understood that the control system algorithm 504 of the control system 452a can be fulfilled by various algorithms. Models 903 can be replaced by any component that is able to store or otherwise internally represent the enterprise network 400/400a, including properties of the production network $P_N$, properties of the deception devices and $P_D$, management system observations $o_N$, deception management system observations $o_N$, as well as any aggregation or manipulation of data required to represent data from sensors 502. Methods for representing data within control system algorithms 504 are well-known such as a graph database, a neural network, an SQL database. Constraints 905 of the autonomic reasoning system 504a can be replaced by components of control system algorithm 504 that provide rules, thresholds, or transition functions that must be adhered to. The adaption functions F and G of the autonomic reasoning system 504a can be replaced in the control system algorithm 504 by any algorithm which is able to perform internal manipulations of the various model-like representations, constraint-like representations in order to select which adaptions to perform. Control systems 504 which implement hypothesis adaption function are likely to require an internal representation of the expected outcome of the test as may be implemented by representing hypothesis test adaption specifications within a model as in the autonomic reasoning system 504a or using other approaches such as storing a probability or confidence level associated with the expected outcome of the test. Some embodiments may also include an expected utility score or reward for performing each adaption. In some representations, the various internal components (models, constraints, and adaption algorithms) are not separable and will be combined into one or two components. For example, the control system algorithm 504 implemented as a neural network or partially observable Markov process would consist of a single functional component which performs similar operations to the autonomic reasoning system but without explicit representation of models, constraints, or adaption or associated implementations. Each of these various implementations may perform the hypothesis adaption function G described below in connection with FIG. 8.

Figure 8:
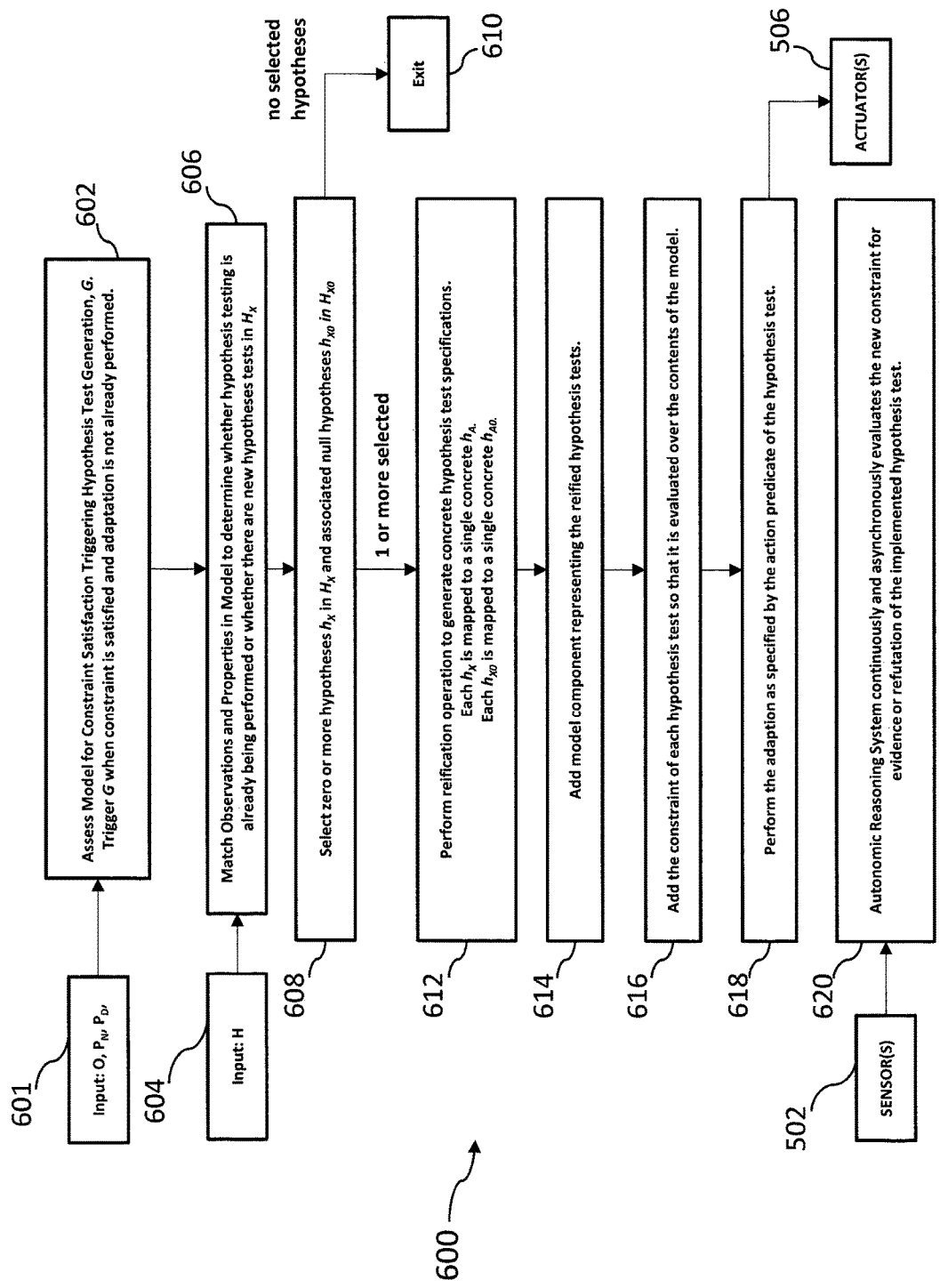
FIG. 8 illustrates a method of utilizing a hypothesis test adaption function in accordance with the present invention.

A method 600 provided by hypothesis test adaption function G is illustrated in FIG. 8.

At step 601, the hypothesis test adaption function G takes as inputs observations O, properties of the production network $P_N$, properties of the deception devices $P_D$, and the adaptive specification $D_F$.

At step 602, constraints defined by the control system 452a are assessed to determine if a constraint 505 has been satisfied. If the constraint results in selection of a hypothesis test adaption, then if an adaption has not already been performed in relation to the constraint 505, then upon satisfy a constraint 505, hypothesis test adaption function G is triggered. In this way, the initial triggering of hypothesis test adaption function. G is algorithmically equivalent to the triggering of an adaption function F. Once G is triggered, then additional steps are taken that incorporate the use of H and model components representing various hypothesis tests which may be being performed on the production network.

At step 604, a set of all available hypotheses H is provided as an input to test adaption function G.

The set of all available hypotheses H contains the sets $H_X$, $H_A$, $H_{A0}$, and $H_{X0}$. The set of all available hypotheses, H, represents the set of all tested and untested hypothesis concerning each attacker. In the present invention, H and all of its elements are represented as a system of constraints and predicates of the control system 452a which operate over the properties and relations of the graph-based representations of $P_D$, $P_N$, and O in the graph-based model of the control system 452a.

$H_X$ is a collection of hypotheses test "templates" which are pre-defined for the adaptive deception system 404 and which may be drawn from when forming new hypothesis concerning an individual attacker $a \in A$, where A is the set of attackers which have been observed.

$H_A$ contains all hypotheses concerning each specific attacker which have been previously observed: $H_A = \bigcup_{a \in A} H_a$. Hypotheses in $H_A$ have been "reified" and each parameter is replaced with a specific property of the environment as represented by $P_D$ and $P_N$, or properties of various observations in O.

$H_{X0}$ and $H_{A0}$, contain the set of null hypotheses for $H_X$ and $H_A$ respectively.

Within the model, each element of $H_A$ extends $H_X$ by also including model relations which connect each supporting or refuting observations, $O_a$, which taken together form the "evidence" supporting or refuting each specific hypothesis $h_A \in H_A$.

Hypotheses in $H_X$ are generic and do not yet refer to any particular set of observations or properties of production or deception devices. These hypotheses are treated as logic predicate "templates" with parameters which will be "reified" in step 612 of FIG. 8. In some cases, hypothesis test adaption function G will have been triggered, but the model will already contain $H_A$ and $H_{A0}$ associated with the currently observed attacker. In these cases, no hypotheses will be selected.

Each hypothesis $h_X \in H_X$ consists of: one or more n-ary action predicates which: specifies the performance of an action on one or more deception devices and/or one or more production devices; identifies zero or more attackers; and includes mathematical and/or categorical relations which relate to the properties found in the graph-based model of the autonomic reasoning system 504a. Each mathematical and/or categorical relation is an expression containing one or more values, value ranges, and at least one of a property of $P_N$ or a property of $P_D$ or a value relating to observations of attacker activities, O, or any combination of properties and observations.

At step 606 the observations O and properties $P_N$ and $P_D$ are matched against hypotheses $H_X$ and $H_A$ to determine whether hypothesis testing is already being performed or whether there are new hypotheses tests in $H_X$ which can be performed.

In general, it is the case that hypotheses can be written to take the form of a modus ponens logical implication: "if p then q" which we represent as p→q. Without loss of generality, for the purposes of describing the present invention, we use this convention. It should be understood that the antecedent p in this case is an adaption to be performed which modifies the properties of a deception element 520a or modifies a property of a production device 422 and q is an expression which relates to either a future property of a deception device 520a or production device 422, or one or more observations $o_D$ or $o_N$ made of an attacker's future interactions with one or more devices (either deception devices 520a or production devices 422 or both).

Below we present several examples of the form of various hypotheses. Each hypothesis takes the form of the logical implication where the antecedent specifies a particular action predicate and the consequent specifies the hypothesized result of applying this action as an adaption to a deception element of the running adaptive deception system. That is:

$h$::actionPredicate($P'_D, P'_N, O'$)→relation
(state0, state1, . . . , stateN).

Each parameter to the action predicate represents a subset of properties or observations ($P'_D \subseteq P_D$, $P'_N \subseteq P_N$, or $O' \subseteq O$ respectively), each of which may also be empty set. Action predicates can be defined to operate over any portion of one of these sets, such as operating over a particular deception device, production device, or observation of a particular attacker.

A null hypothesis is defined for each hypothesis in $H_X$ and $H_A$, generally consisting of a similarly defined predicate but with an inverse relation which is defined to provide a means of predicting that performing the actions dictated by the action predicate will result in no change to observations in O made of attacker interactions or properties of $P_N$ or $P_D$. Each inverse relation is defined according to the meaning of the original relation such that observations of the truth of the inverse relation provides evidence of behavior as observed in O, $P_D$, or $P_N$ are such that the environment or attacker were unaffected by the experimental manipulation represented by $h_X$. That is:

$h$::actionPredicate($P'_D, P'_N, O'$)→inverseRelation
(state0, state1, . . . , stateN)

In the above expressions, the relation and inverseRelation are predicates which are parameterized by the various states found within particular properties or observations ($p_N \in P_N$, $p_D \in P_D$, or $O_a \in O$). Further, each relation may be a unary relation defined over a single state, a binary relation over a pair of states, or an n-ary relation defined over n states found within the input sets. Each h is defined using relations appropriate for the domain of a particular state or states. This includes all commonly used logic relations, but may also include relations such as those of predicate logic or linear temporal logic to specify relations between states that refer to time. Predicate logics and logics such as linear temporal logic provide general purpose methods for relating the values between states over time and are particularly useful in defining hypotheses which expect a change in attacker behavior over time as a result of the action taken by the hypothesis test.

The specific relations used to form elements of H vary depending on the particular properties which are likely to be present in $P_N$ or $P_D$. If the elements of $P_N$ and/or $P_D$ contain properties such as operating system and service information, then relations in H can be written to refer to these specific properties.

At step 608 a hypothesis $h_X \in H_X$ and the associated null hypotheses $h_{X0} \in H_{X0}$ are selected. Based on the inputs which have been provided to the hypothesis generation function and whether the model already contains reified instances of $H_X$, select a set of hypotheses which have template parameters in the action predicate which match the provided subsets that were taken as input: $P'_D$, $P'_N$, $O'$. As illustrated at step 610, if no hypotheses are selected, the function is exited. If elements of $H_X$ match, then the matching subset $h_X$ and associated null hypotheses $h_{X0}$ are provided to step 612 for reification.

At step 612 a reification is performed to generate concrete hypothesis test adaption specifications. Hypotheses in the set $H_X$ have not yet been "reified". Reification is a process by which a general-purpose predicate is made concrete by replacing its parameters with concrete inputs such that the predicate can be evaluated. Reification is a well understood term of the art in knowledge representation as applied to the use of predicate logic to represent semantic relationships using n-ary relations. Prior to reification, each hypothesis is defined using generic placeholder parameters rather than specific values. For the present invention, reification of hypotheses in $H_X$ is the process by which a parameter of an expression in the hypothesis is assigned numeric or categorical values based on observations in O, $P_D$, or $P_N$.

When a new observation is provided to G, the hypothesis test adaption function uses this observation and the properties of deception elements and production elements to select an appropriate pre-defined hypothesis and perform a reification operation to replace its current parameters with the parameters related to the observation which triggered the hypothesis test generation. At the same time, a null hypothesis is similarly reified in order to validate a difference in performance between the reified hypothesis and the null condition for the test. Each $h_X$ is mapped to a single concretized $h_A$ and each $h_{X0}$ is mapped to a single $h_{A0}$.

Reification is an important characteristic of the present invention as it allows computation of constraints with partial knowledge (where only a subset of the parameters of a particular hypothesis are explicitly defined). This allows hypotheses to be used even though full and complete specification of the hypothesis is not possible.

At step 614 model components representing each reified hypothesis test are added to the model of the autonomic reasoning system 504a. Each reified hypothesis is represented directly within the model such that additional future observations can be used to directly model whether new observations provide supporting or refuting evidence for the hypothesis. In many cases refuting evidence will be supporting evidence for the associated null hypothesis.

At step 616 the constraint of each hypothesis test is added to the autonomic reasoning system 504a. Each hypothesis tests consists of an action predicate and an associated constraint. The associated constraint of the right-hand side of each hypothesis test is added directly as a new constraint to the autonomic reasoning system 504a. In this way, satisfaction of the constraint will trigger an evaluation of the parameters of the hypothesis which will then either support or refute the hypothesis.

For example, for an adaptive deception system 404 which includes managers configured to modify the network latency of deception devices may include the following pre-defined hypothesis in $H_X$ which specifies a un-reified relation:

$$h_x[1]::addDelay(d,a) \to \exists o[1]_{d,a}, o[0]_{d,a} \in O \text{ where } latency(o[1]d,a\cdot time) > latency(o[0]_{d,a}\cdot time)$$

For notational simplicity, it should be understood that the right-hand side of implication expression (to the right of the arrow) operates over all observations in O such that the right-hand side is true if there exists observations that meet the criteria of the relation. That is, the expression should be understood as quantified by the expression: $\exists o[1]_{d,a}, o[0]_{d,a} \in O$.

This hypothesis test adaption specification means the following: If the "addDelay" predicate is applied to deception device d for attacker a then there will exist observations o[1] and o[0] in O where the latency for observations of this same deception device and attacker will be greater than previous observations. For notational simplicity we are using the convention where indices over observations are meant to convey time ordering of observations. That is, o[1] occurs sometime after o[0] or more generally o[k] occurs after o[k] when j<k.

When this hypothesis is reified, the particular d and a will be explicitly defined in the action predicate for implementation in step 618 as well as in the constraint which compares the latency of observations t different times.

If, at some point in time there exists at least two observations for which the latency has increased, then the constraint will be satisfied and thus provides supporting evidence for the hypothesis.

Similarly, a null hypothesis is also stored within the model and as a set of constraints. In this instance, namely:

$$h_0[1]::addDelay(d,a) \to \not\exists o[1]_{d,a}, o[0]_{d,a} \in O \text{ where } latency(o[1]_{d,a}\cdot time) > latency(o[0]_{d,a}\cdot time)$$

This hypothesis is supported for any pair of observations for which latency does not increase. For the purposes of this example, the "addDelay" action predicate is fully expected to increase latency, so the strong null hypothesis is used to ensure that evidence collected in the model will cause this constraint to be satisfied each time an observation is made which meets the criteria.

$H_X$, may include other relations an element of the data structure h may consist of but are not limited to one or more of the following various relations:

$$h_x[2]::addDecoy(d,a) \to \exists o[1]_{d,a} \in O \text{ where } interact(o[1]_{d,a})$$

Where the "interact" relation determines if an interaction has occurred for attacker a and deception device d. This criteria of this predicate is met if there exists an observation in which the attacker a interacts with the deception device/decoy d.

$$h_x[3]::startService(d) \to \exists o[1]_{d,a} \in O \text{ where } interact(o[1]_{d,a})$$

Where the hypothesis is that starting a new service on deception device d will result in the attacker a interacting, with this deception device at some point in time in the future.

Additionally, more than one implication may be defined for each action predicate with various relations which hypothesize the future state of the system as represented by $P_D$ and $P_N$, of observable interactions in O. For example, the addDecoy action predicate may also be incorporated into a hypothesis such as:

$$h_x[4]::addDecoy(d,a) \to \not\exists o[1]_{d,a} \in O \text{ where } interact(o[1]_{d,a})$$

Where the hypothesis is that adding a deception device/decoy d will result in the attacker a to fail to interact with this particular attacker indefinitely, perhaps due to the particular deception device/decoy being intentionally obvious in its behavior as being deceptive, such as presenting features which indicate that the device is a deception device/decoy.

For each of the general purposes hypotheses definitions in $H_X$ there is also a pre-defined null-hypothesis in $H_0$. For the examples $h_X[1]$ through $h_X[4]$ above, null hypothesis can be defined as follows:

$$h_0[2]::addDecoy(d,a) \to \not\exists o[1]_{d,a} \in O \text{ where } interact(o[1]_{d,a})$$

$$h_0[3]::startService(d) \to \not\exists o[1]_{d,a} \in O \text{ where } interact(o[1]_{d,a})$$

$$h_0[4]::addDecoy(d,a) \to \exists o[1]_{d,a} \in O \text{ where } interact(o[1]_{d,a})$$

Many alternative formulations of each of the hypothesis are possible. Additionally, hypotheses may also incorporate predicates which perform operations over particular sets of parameters, such as performing frequency counts over the various interactions which have been observed. Additionally, hypotheses may also incorporate additional specificity in regards to particular properties of each observation or of production devices or deception devices.

At step 618 the hypothesis test adaption specification $D_G$, as specified by the action predicate, is performed.

This step is identical in its operation to the implementation of any adaption specification which is performed by the system. The action predicate/hypothesis test adaption specification $D_G$ is used to directly activate one or more actuators 506, which in turn communicates with one or more managers 458 of the deception management system 450 to implement the hypothesis test adaption specification $D_G$.

At step 620 the autonomic reasoning system 504a continues to evaluate new constraints for evidence or refutation of the implemented hypothesis test. As before the hypothesis test generation function was triggered, the adaptive deception system 404 and its autonomic reasoning system 504a continues to operate. Each additional input provided by the sensor(s) 502 may provide additional observations which may trigger the newly implemented constraints and provide evidence or refutation of the implemented hypothesis test.

In some instances, it is advantageous for each hypothesis to include in each relation a halting criterion for the hypothesis test. This additional criterion is defined for each hypothesis in order to enforce that the hypothesis test will complete after what is deemed to be a suitable time period over which the test is to be performed. The additional criterion takes the form as a conjunction with the primary relation of the hypothesis tests. This places a constraint on the time elapsed since the hypothesis test was implemented which is then directly evaluated by the autonomic reasoning system 504a. If this halting criterion is satisfied, then the action which was taken by the action predicate will be reversed through implementation of a counterbalancing action. In cases where the action predicate is taking constant action, the action performed by the actuator will be forced to cease. In practice, it would be straightforward to parameterize the halting criteria based on properties of the observations O of production devices 422 or deception devices 420.

Figure 9:
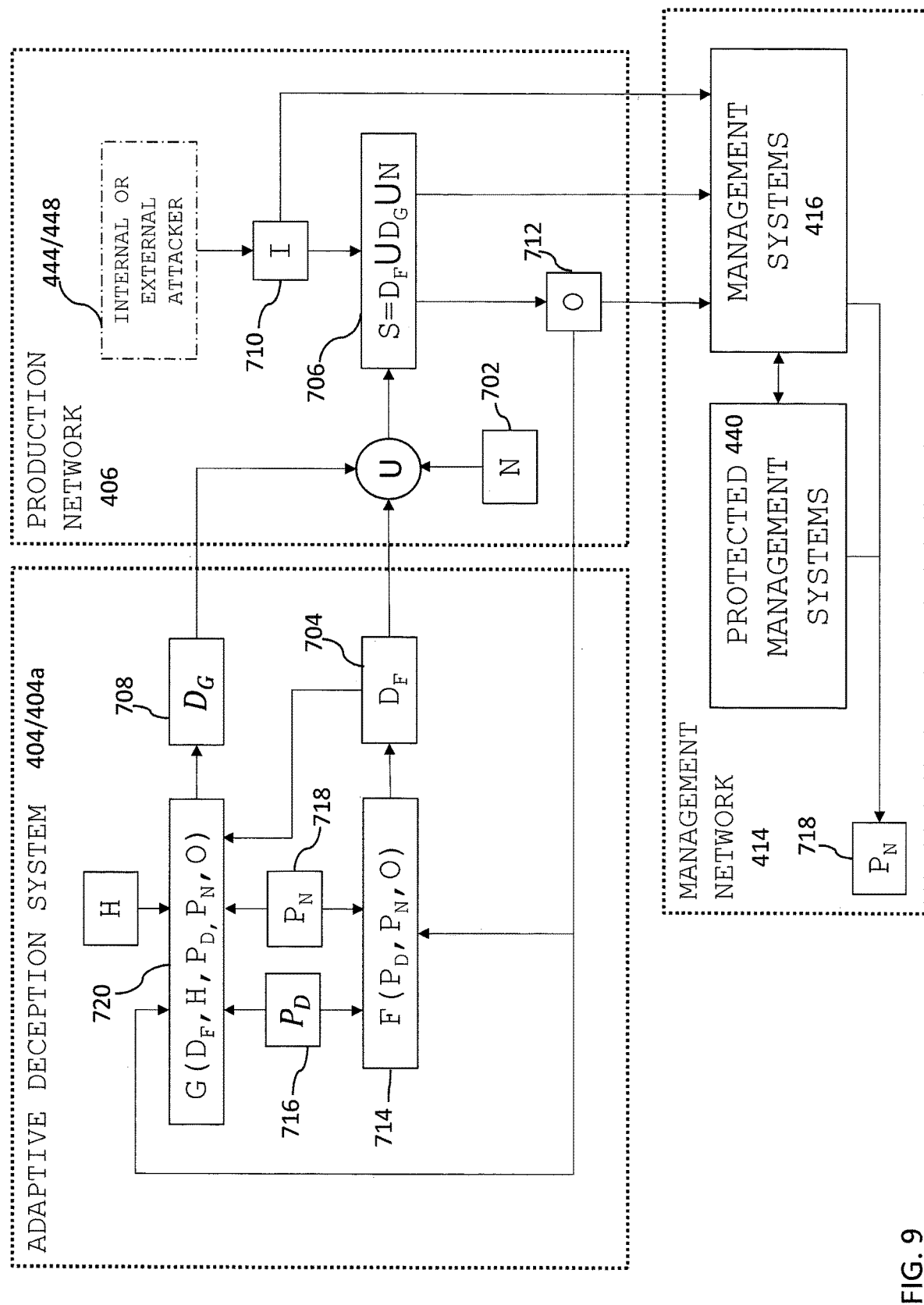
FIG. 9 illustrates a state diagram for the adaptive deception management system of the present invention.

FIG. 9 is an abstract state diagram 700 illustrating the relationship between the adaption function F and the optional hypothesis test adaption function G and the states of the production and management networks 406, 414.

As illustrated in FIG. 9, the states N 702 of the set of production devices 422 of the production network 406 along with the states 704 provided by the adaption specification $D_F$ create a set S 706. Optionally the states 708 provided by the hypothesis test adaption specification $D_G$ are also included in the set S 706. Set S represents therefore the union set of all devices which are connected to the production network (i.e. $S\ D_F \cup D_G \cup N$).

Interactions I 710 of an internal or external attacker 444/448 who is interacting with devices on the production network consist of any form of communication with any system on the production network. The action can be as simple as sending a single TCP SYN packet, and ICMP "ping" packet, or can consist of multiple packet-level interactions made during the course of a TCP or UDP communication session with a particular device in N 702. Interactions may be benign or malicious or may be mistakenly deemed benign due to not flagging any alarms in intrusion detection systems, firewall rules, alerting systems, or other management systems 416 on the management network 414.

When an attacker 444/448 performs interactions I 710 with devices on the production network 406, observations are made of observable interactions. Set O 712 is an abstract representation of the states of the observations.

The adaptive deception management system 404 provides the adaption function F 714. The adaption function F 714 receives the set $P_D$ 716 which is an abstract representation of the states of all currently available deception devices 520 and all of the configurable properties associated with the deception devices 520 which are currently available to the deception management system 450. The set of deception device properties $P_D$ 716 consists of both pre-configured deception devices 520 of various configurations which are suitable for many different production networks 406 as well as custom deception devices 520 created by a system administrator familiar with the production network 406 that the deception devices 520 will be used to protect.

The adaption function F 714 receives the set $P_N$ 718 which is an abstract representation of the state of the current production network 406 and all of the configurable properties associated with the production devices 422. $P_N$ 718 is generally provided by management systems 416 on the management network 414. The set of production network properties $P_N$ 718 consists of various properties of system and service configurations. Production network properties 718 may include, for example, the state of a service, such as for example, STOPPED, STARTING, RUNNING, PAUSED, or port binding. Production network properties 718 may extend to more specific details of a service such as for example, user accounts, or whether data is present on specific network device 422 or network-accessible storage devices 422. Production network properties 718 may also include information relating to the security posture of a system such as the state and configuration of a filtering firewall. As observations O 712 are provided to the management system 416. In response to the observations O, the management system 416 may provide new properties $P_N^*$ 718.

The adaption function $\mathcal{F}(P_D, P_N, O)$ takes as input the set of deception device properties $P_D$ 716, the set of production device properties $P_N$ 718, and the set of observations O 712 from deception management system 450 and management systems 416/440 on the management network 414. The deception adaption function $\mathcal{F}(P_D, P_N, O)$ returns an adaption specification $D_F$ specifying the adaption to be provided to the production network 406 have been adapted to match particular real devices and to interfere with an attacker's interactions. The adaption function $\mathcal{F}(P_D, P_N, O)$ may be triggered under several different conditions. For example, updates to the production network will result in updates to the contents of $P_N$, which may trigger adaption. Similarly, if the set of available properties in $P_D$ are updated, this may also trigger adaption.

The adaptive deception management system 404 optionally provides the hypothesis test adaption function G 720. The hypothesis test adaption function $G(D_F, H, P_D, P_N, O)$ takes as input the adaption specification $D_F$ 704, the set of hypotheses H, the set of deception device properties $P_D$ 716, the set of production device properties $P_N$ 718, and the set of observations O 712. The hypothesis test adaption function $G(D_F, H, P_D, P_N, O)$ returns a hypothesis test adaption specification $D_G$ specifying the hypothesis test adaption to be provided to the production network 406 to test a selected hypothesis $h_A$ and a null hypothesis $h_0$.

The hypothesis test adaption function $G(D_F, H, P_D, P_N, O)$ may be triggered directly under several different conditions. For example, updates to the production network may result in updates to the contents of $P_N$, which may trigger adaption by F or hypothesis testing by G. Similarly, if the set of available properties in $P_D$ are updated, this may also trigger adaption or hypothesis testing. Similarly, an observation in O may trigger adaption or hypothesis testing.

Alternatively, G may be triggered indirectly through first triggering of F for which one of the adaptions defined within F is to perform a hypothesis test for the particular $D_F$. The reasons that F may trigger G are that a particular $D_F$ generated by F is not known to be suitable for the known $P_N$, $P_D$, and O. Alternatively, F may trigger G when no $D_F$ are able to be generated, resulting in passing a null set $D_F$ to G and where G will subsequently use $P_N$, $P_D$, and to select a hypothesis to test and implement this hypothesis by calling an actuator. a particular observation may satisfy a constraint within F for which the resulting adaption is to execute Gi n order to perform a hypothesis test of one or more adaptions that are net yet known to be suitable for interfering with the current attacker on the current production network.

The function G can perform exploration of novel deception device configurations. In instances where a novel adaption is generated randomly, very little may be known about its suitability against a particular attacker. In these instances, G may be triggered in order to determine if there is a suitable hypothesis test in H which could experimentally test the new adaption for the present production environment. G is also used to verify properties of the observed interactions of particular attacker by observing the attacker's 444/448 responses to specific adaptions (such as measuring when an attacker ceases interaction with a particular decoy as the delay in interacting with the deception device increases). Whereas F is used to optimize $P_D$ by adapting configurations, generating new deception device configurations, and adapting existing deception device configurations, G is used to test various deception configurations which are produced by F to validate their suitability for the production network and for the particular attacker who is interacting with devices on the production network.

As time progresses, new observations O 712 are provided to functions F and G as represented by the feedback arrow 730. In addition, new production properties $P_N$ and new deception device properties $P_D$ are provided to functions F and G. This feedback allows for real-time and continuous adaption of the production network to interfere with the attacker's interactions. Further, as time progresses, the system will have many opportunities to perform hypothesis testing via G. Each hypothesis test generates new information regarding the suitability of particular adaptions for production devices and deception devices on the production network. This information can then guide subsequent adaptions by F.

Similarly, given sufficient storage, the detailed history of the attacker's interactions may include raw network packet captures which can be used for later analysis for the purposes of hypothesis testing using the hypothesis generation function G(H, $P_D$, $P_N$, O) and for informing the deception adaption and optimization function, $\mathcal{F}$ ($P_D$, $P_N$, O). Whether or not these past observations are treated as belonging to the same attacker depends on how well the observable characteristics match between current and past observations.

In some embodiments, the algorithm used to guide adaption may be configurable by a user as a user-selected goal. The selected goal is communicated by the user through interaction with the API 480 of the deception management system which provides the user selected goal to the autonomies control system 452a along with the other properties contained in $P_D$. In such embodiments, different constraints may then be used by the control system in a straightforward manner where each constraint is taken into consideration in relation to each goal state to which the constraint applies. Similarly, in the case of a system which incorporates user-defined goals, each adaption algorithm may perform operations which depend on the currently selected goal, taking different branches in a conditional or case statement which depend on the selected goal. User-defined goals can be provided to the functions F and G via including them within $P_N$ or $P_D$ depending on the source of the user-defined goal preference. The user-directed goals may include for example, denying the attacker access ("deny"); delaying the attacker's access ("delay"); deterring the attacker from interacting with a specific system ("deter")"; disrupting the attacker's plan of attack ("disrupt"); misinforming the attacker about the network/system ("deceive"); or learning about the attacker ("learn"). The user-directed goal may be motivated by the operator's beliefs as to what actions will be most impactful to the attacker; what actions will be least impactful to the network and IT operations; what actions would assist/harm mission priorities; or what actions would be effective against a particular attack. Each user-directed goal will have subsets of the models, constraints and adaption algorithms that align with that goal (and some may align with multiple goals) and with each defensive action implemented by the actuator being based on a previous observation of the attacker or the network.

In other embodiments, the hypothesis generation function G may be used to perform individual tests of various goals to determine which goal is the most reachable.

Figure 10:
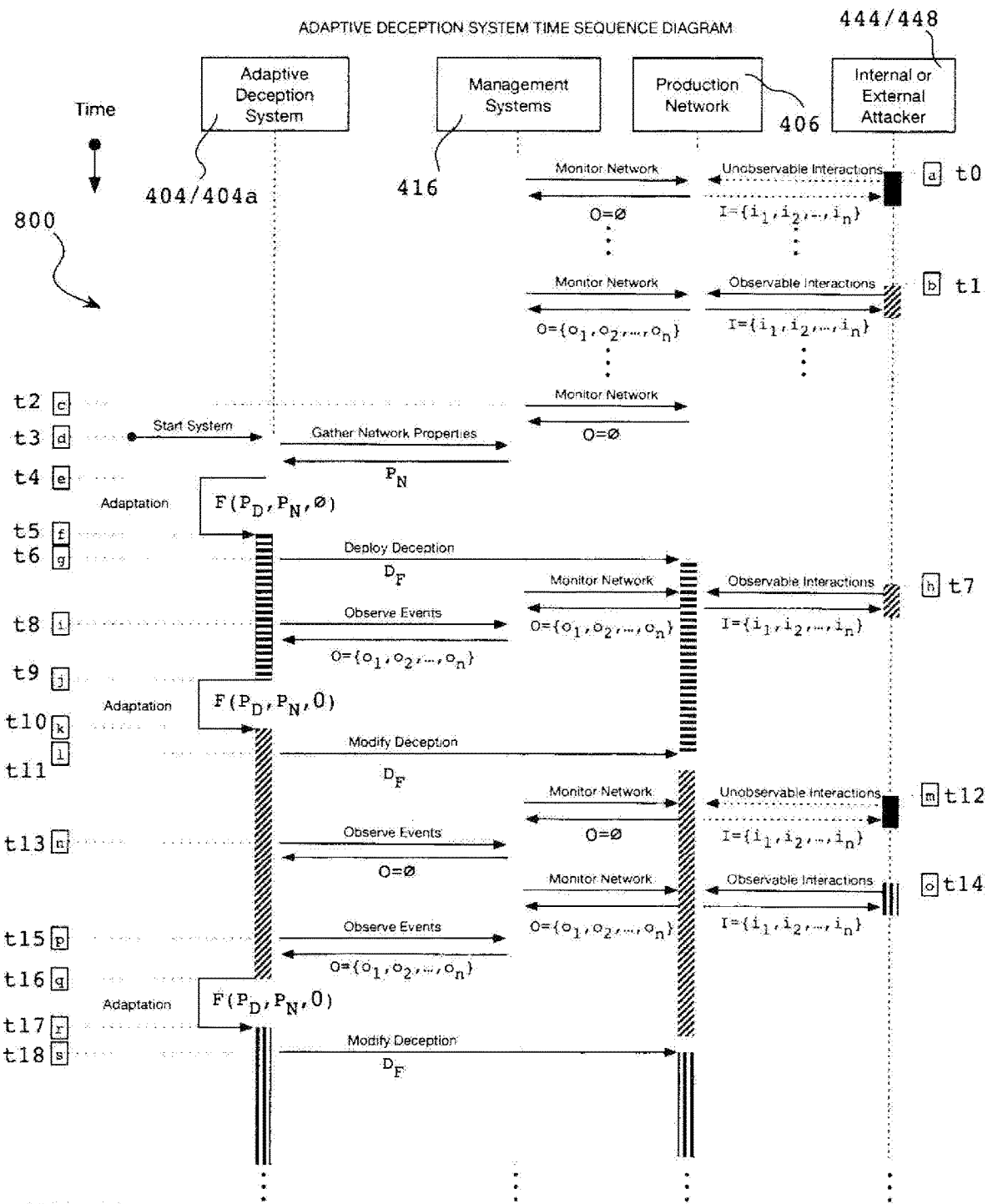
FIG. 10 illustrates a timing sequence diagram illustrating a sequence of actions performed by an adaptive deception system of the present invention.

FIG. 10 illustrates a time-sequence diagram 800 showing a sample sequence of actions resulting from the utilization of an adaptive deception system 404. Action between an internal or external attacker 444/448 with devices on a production network 406; monitoring of the production network 406 by one or more management systems 416; and the implementation of one or more adaptions by the adaptive deception system 404 based upon network properties $P_N$, deception properties $P_D$ and observations made by the monitors of the management systems 416 are illustrated.

At time $t_0$, an attacker performs interactions I with a device 422 on the production network 406. These interactions I are not observable due to their not being flagged by any management system 416 as being malicious or harmful.

At time $t_1$, the attacker performs interactions with a device 422 on the production network 406 which is observable to one or more management systems 416 due to the interactions being identified by one or more management system 416 as malicious or harmful.

At time t2, one or more network monitors 416 on the production network 406 inform one or more management systems 416 of observations made. At time t2 the set of observations is the null set or empty set.

At time t3, the adaptive deception system is started. Network properties are gathered and $P_N$ is provided to the deception management system through interaction of the deception management system 404 with one or more management system 416 on the management network 414.

At time t4, the adaptive deception system 404 has received through its sensors 502 the null set of observations, the properties of production devices $P_N$, and the adaptive deception system 404 has internal representations of the properties of deception device properties $P_D$. The adaptive deception system 404 initiates adaption using function F.

At time t5, the adaptive deception system 404 has run an adaption algorithm, F, and specified one or more adaptions DP- to perform on one or more deception device. The properties of the deception devices 420 are adapted to interfere with the attacker 444/448 based on observations made of the attacker's interactions.

At time t6, the adaptions $D_F$ specified by the adaption algorithm F are deployed onto the production network 406 such that each deception device is connected to the production network 406 and can be interacted with by other devices 422 on the production network 406.

At time t7, the attacker 444/448 interacts with one or more devices 422 on the production network where the attacker's interactions are observable. The observable interactions are monitored by one or more management system 416 on the management network 414. In some cases, the attacker's interaction will be observable due to one or more management systems 416 that is not the adaptive deception system 404. In other cases, the attacker's interaction will be observable due to the attacker's interaction with a deception device 420. In some cases, the only management system which will observe these interactions will be the deception management system.

At time t8, the observable interactions of the attacker which have been monitored by one or more management system are made observable to the adaptive deception system 404. In some cases, the interactions are observable due to the attacker interacting directly with a deception device. In other cases, the interactions are observable due to a management system other than the adaptive deception system 404 providing these observable interactions to the adaptive deception system 404.

At time t9, the newly observed interactions from time t8 trigger an adaption algorithm by the adaptive deception system 404. Just as at time t4, the adaptive deception system 404 performs one or more adaptions based on $P_D$, $P_N$, and the set of observations O.

At time t10, the adaptive deception system 404 has run an adaption algorithm, F, and selected one or more adaptions $D_F$ to perform on one or more deception device 420.

At time t11, the adaptions selected by the adaption algorithm F are used to modify 824 one or more deception devices on the production network 406 such that each deception device 420 is connected to the production network 406 and can be interacted with by other devices 422 on the production network 406.

At time t12, an attacker 444/448 performs interactions with a device 422 on the production network. These interactions are not observable due to their not being flagged by any management system 416 as being malicious or harmful.

At time t13, the set of observable events O is empty due to the attacker's interactions being unobservable at time t12.

At time t14 the attacker interacts with a device 422 on the production network 406 which is observable to one or more management systems 416 due to the interactions being identified by one or more management system 416 as malicious or harmful.

At time t15 the adaptive deception system 404 receives observations of the interactions made by the attacker at time t14

At time t16 the adaptive deception system initiates adaption using function F based upon the new observations made at time t14 and the properties of production devices $P_N$, and the properties of decoy devices $P_D$.

At time t17 the adaptive deception system has completed running the adaption function.

At time t18 the adaptive deception system implements the adaption on one or more deception devices on the production network 406.

A number of advantages are provided by adaptive deception system. The adaptive deception system presents various deceptive devices on a computer network which effect an attacker's perception of the network environment. The attacker will often perform actions differently due to misinformation produced by the deceptive elements which allows the adaptive deception system to learn attacker characteristics while simultaneously leading the attacker to incorrect conclusions about which systems may contain critical information or security flaws. More specifically, we demonstrate methods and algorithms to perform manipulation of a cyber-deception environment consisting of in-situ and progressive adaption of decoys, where the adaption is specifically performed based on observations made of prior related attacker activities and where the learned characteristics are then used to perform automated adaption of the cyber deception environment to impede attacker activity; additional optional functionality can allow for high-level user-specified goals which scope the adaptions ensuring the actions performed align with the user's (i.e., the network defender's) desired goals. Adaptive deception systems can be composed of deception elements such as decoys which are designed and configured to be very light-weight and inexpensive to reconfigure, create, destroy, or discard. The adaptive decoy is automatically adjusted over time based on feedback from observations. The use of decoys dramatically increases the risk of detection for an attacker. The lightweight nature of decoys makes them cost effective to create and run at scale. The low cost of creating, modifying, and managing decoys allows for flexible strategies to impede attacker progress, interfere with attacker interactions, and to learn how an attacker reacts to changes to the environment. The incorporation of fully-automated adaption helps ensure that the attacker remains at a disadvantage in their interaction with systems and networks protected by the adaptive deception system. Not only does our approach facilitate an attacker's continued interaction with decoys, it also dramatically increasing attacker costs through automated reconfiguration of decoy and other deception elements. In the event the attacker realizes that the asset they have interacted with isn't real, this information doesn't help them determine which of the remaining assets may be decoys; optionally, that decoy can be automatically destroyed and a new decoy with similar or different features can be automatically deployed in a new location to replace it. Unlike traditional high-fidelity honeypots and honeynets, an attacker learning that a particular system is a decoy does not have a high cost for the defender. While misinforming an attacker prior to an attack can lead the attacker into attacking the wrong system and to being detected, misinforming an attacker after an attack can leverage information learned through an attacker's interactions. Further, in our approach the quality, quantity, and veracity of misinformation is based on observed characteristics of the attack and of the attacker.

The invention claimed is:

1. A method of defending a production network from a cyber-attack, the method comprising the steps of:
 providing an adaptive deception system comprising:
  a deception management system in communication with a management network, including a monitor and a manager, and hosting at least one container system service; the container system service including at least one deception device available for deployment to a production network; and
  a control system including:
   at least one sensor in communication with said monitor, and
   at least one actuator in communication with said manager;
 receiving, by one of said at least one sensor, production device properties defining production devices of the production network;
 receiving, by one of said at least one sensor, deception device properties defining the at least one deception device of the production network;

utilizing said monitor to make deception management system observations and providing said deception management system observations to one of said at least one sensor;

aggregating said deception management system observations to derive attacker observations;

processing by said control system said production device properties, said deception device properties, said deception management system observations, and said derived attacker observations, to provide a hypothesis test adaption specification defining a hypothesis to be tested;

activating said actuators to implement said hypothesis test adaption specification;

updating said deception management system in accordance with said hypothesis test adaption specification;

receiving, by one of said at least one sensor, new production device properties defining production devices of the production network;

receiving, by one of said at least one sensor, new deception device properties defining the at least one deception device of the production network;

utilizing said monitor to make new deception management system observations and providing said new deception management system observations to one of said at least one sensor; and processing by said control system said new production device properties, said new deception device properties, and said new deception management system observations, to evaluate said hypothesis.

2. The method of claim 1, further comprising the step of:
utilizing said monitor to make management system observations and providing said management system observations to said sensor; and wherein
said step of processing by said control system further includes the step of processing said management system observations.

3. The method of claim 1, further comprising the step of:
updating said deception device properties based upon said evaluation.

4. The method of claim 1, wherein the production network includes a deployed deception device.

5. The method of claim 1, wherein said step of updating said deception management system further includes:
deploying at least one deception device of the deception management system to the production network.

6. The method of claim 1, further comprising the step of:
processing by said control system said production device properties, said deception device properties and said deception management system observations, to provide updated production network properties; and
triggering said actuators to communicate said updated production network properties to the management network; and
updating the production network in accordance with said updated production network properties.

7. The method of claim 1, further including the steps of:
aggregating said management system observations to derive system observations; and
wherein said step of processing by said control system includes processing of said derived system observations.

8. The method of claim 1, wherein said adaption specification includes new properties to be provided to a previously deployed decoy.

9. The method of claim 1, wherein said adaption specification includes properties of a new decoy to be deployed to the production network.

10. The method of claim 1, further including the step of:
providing a user defined goal to said control system; and
wherein said step of processing by said control system further includes the step of processing said user defined goal to provide said adaption specification.

11. The method of claim 1, wherein the control system is an autonomic control system.

12. The method of claim 1, wherein the control system is a reinforcement learning system.

13. The method of claim 1, wherein the control system is a convolutional neural network.

14. The method of claim 1, further comprising forming new hypotheses with said control system.

15. The method of claim 14, wherein forming new hypotheses occurs continuously with the receiving new production device properties, receiving new deception device properties, and making new deception management system observations.

16. The method of claim 1, wherein the hypothesis test adaption specification performs an experimentally controlled test of the suitability of a particular adaption specification against a particular attacker.

17. An adaptive deception system for defending a production network including production devices from a cyberattack, comprising:
a deception management system in communication with a management network, including a monitor and a manager; and hosting at least one container system service including at least one deception device available for deployment to a production network; and
a control system including:
at least one sensor configured to receive production device properties, deception device properties, deception management system observations, derived attacker observations, new production device properties, new deception device properties, and new deception management system observations from said monitor,
an algorithm for providing a hypothesis test adaption specification, defining a hypothesis to be tested, in response to said production device properties, said deception device properties, said deception management system observations, and said derived attacker observations, and evaluating said hypothesis in response to said new production device properties, said new deception device properties, and said new deception management system observations; and
at least one actuator for implementing said hypothesis test adaption specification.

18. The adaptive deception system of claim 17, wherein:
said monitor is further configured to make management system observations;
at least one sensor of said control system is configured to receive said management system observations; and
said hypothesis test adaption specification provided by said control system is in response to said management system observations.

19. The adaptive deception system of claim 17, wherein the algorithm also forms new hypotheses.

* * * * *